US012615425B2

(12) United States Patent
Kim

(10) Patent No.: US 12,615,425 B2
(45) Date of Patent: Apr. 28, 2026

(54) CAMERA ACTUATOR AND CAMERA MODULE INCLUDING SAME

(71) Applicant: LG INNOTEK CO., LTD., Seoul (KR)

(72) Inventor: Kyung Won Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 468 days.

(21) Appl. No.: 17/917,838

(22) PCT Filed: Apr. 8, 2021

(86) PCT No.: PCT/KR2021/004447
§ 371 (c)(1),
(2) Date: Oct. 7, 2022

(87) PCT Pub. No.: WO2021/206484
PCT Pub. Date: Oct. 14, 2021

(65) Prior Publication Data
US 2024/0388783 A1 Nov. 21, 2024

(30) Foreign Application Priority Data

Apr. 9, 2020 (KR) ........................ 10-2020-0043389

(51) Int. Cl.
*H04N 23/55* (2023.01)
*G03B 3/10* (2021.01)
(Continued)

(52) U.S. Cl.
CPC .............. *H04N 23/55* (2023.01); *G03B 3/10* (2013.01); *G03B 5/00* (2013.01); *G03B 13/36* (2013.01);
(Continued)

(58) Field of Classification Search
CPC . H04N 23/55; G03B 5/00; G03B 3/10; G03B 13/36; G03B 17/12; G03B 17/17;
(Continued)

(56) References Cited

U.S. PATENT DOCUMENTS

| | | | |
|---|---|---|---|
| 7,065,295 B2 | 6/2006 | Jeong et al. | |
| 7,777,969 B2 | 8/2010 | Shirono et al. | |

(Continued)

FOREIGN PATENT DOCUMENTS

| | | |
|---|---|---|
| CN | 1573499 A | 2/2005 |
| KR | 10-2007-0050492 A | 5/2007 |

(Continued)

OTHER PUBLICATIONS

Extended European Search Report for European Application No. 21785123.7, dated Mar. 11, 2024.

*Primary Examiner* — Bumsuk Won
*Assistant Examiner* — Alex P Rickel
(74) *Attorney, Agent, or Firm* — Birch, Stewart, Kolasch & Birch, LLP

(57) ABSTRACT

A camera actuator having a first lens unit, a first lens barrel, and a second lens barrel sequentially arranged in a housing. The camera actuator further includes a first driving unit and a second driving unit for moving the first lens barrel and the second lens barrel in an optical axis direction. Each of the first and second lens barrels includes an upper surface, a lower surface, and side surfaces facing an inner upper surface, an inner lower surface, and an inner side surfaces of the housing. The upper surface of the first lens barrel includes a first stepped portion. The lower surface of the second lens barrel includes a second stepped portion. A first distance from one side surface of the second lens barrel to the second stepped portion is different from a second distance from one side surface of the first lens barrel to the first stepped portion.

16 Claims, 16 Drawing Sheets

(51) Int. Cl.

| | | |
|---|---|---|
| *G03B 5/00* | (2021.01) | |
| *G03B 13/36* | (2021.01) | |
| *G03B 17/12* | (2021.01) | |
| *G03B 17/17* | (2021.01) | |
| *G03B 30/00* | (2021.01) | |

(52) U.S. Cl.
CPC ............. *G03B 17/12* (2013.01); *G03B 17/17* (2013.01); *G03B 30/00* (2021.01); *G03B 2205/0046* (2013.01)

(58) Field of Classification Search
CPC .... G03B 2205/0046; G03B 2205/0053; G03B 2205/0007; G03B 2205/0023; G03B 2205/0061
See application file for complete search history.

(56) References Cited

U.S. PATENT DOCUMENTS

| | | | |
|---|---|---|---|
| 7,817,353 | B2 | 10/2010 | Oh et al. |
| 8,159,762 | B2 | 4/2012 | Lim et al. |
| 10,983,414 | B2 | 4/2021 | Byon et al. |
| 11,258,931 | B2 | 2/2022 | Kang |
| 11,706,513 | B2 | 7/2023 | Kang |
| 12,066,690 | B2 | 8/2024 | Park |

| | | | | |
|---|---|---|---|---|
| 2003/0202262 | A1 | 10/2003 | Sasaki et al. | |
| 2004/0247306 | A1 | 12/2004 | Jeong et al. | |
| 2008/0192363 | A1 | 8/2008 | Shirono et al. | |
| 2008/0211955 | A1 | 9/2008 | Avital et al. | |
| 2015/0215542 | A1* | 7/2015 | Nomura | H04N 23/55 |
| | | | | 348/208.11 |
| 2019/0137730 | A1* | 5/2019 | Fujiwara | G02B 7/006 |
| 2020/0409015 | A1 | 12/2020 | Kim et al. | |
| 2021/0018719 | A1 | 1/2021 | Park | |
| 2021/0041658 | A1 | 2/2021 | Jang | |
| 2021/0092264 | A1 | 3/2021 | Kang | |
| 2022/0146783 | A1 | 5/2022 | Kang | |
| 2023/0075967 | A1* | 3/2023 | Hwang | H04N 23/58 |
| 2023/0412906 | A1 | 12/2023 | Kang | |
| 2024/0319472 | A1* | 9/2024 | Kwon | G03B 17/12 |
| 2024/0377609 | A1 | 11/2024 | Park | |

FOREIGN PATENT DOCUMENTS

| | | |
|---|---|---|
| KR | 10-2008-0063099 A | 7/2008 |
| KR | 10-2011-0042604 A | 4/2011 |
| KR | 10-2012-0041032 A | 4/2012 |
| KR | 10-2016-0009866 A | 1/2016 |
| KR | 10-2019-0037532 A | 4/2019 |
| KR | 10-2019-0101762 A | 9/2019 |
| KR | 10-2019-0103862 A | 9/2019 |
| WO | WO 2019/151700 A1 | 6/2019 |
| WO | WO 2019/199129 A1 | 10/2019 |

* cited by examiner

【FIG. 1】
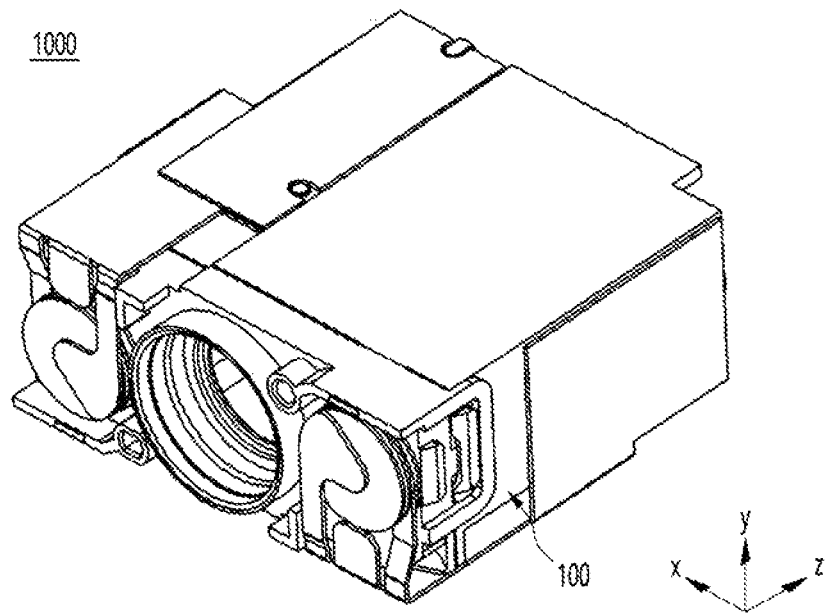

【FIG. 2】
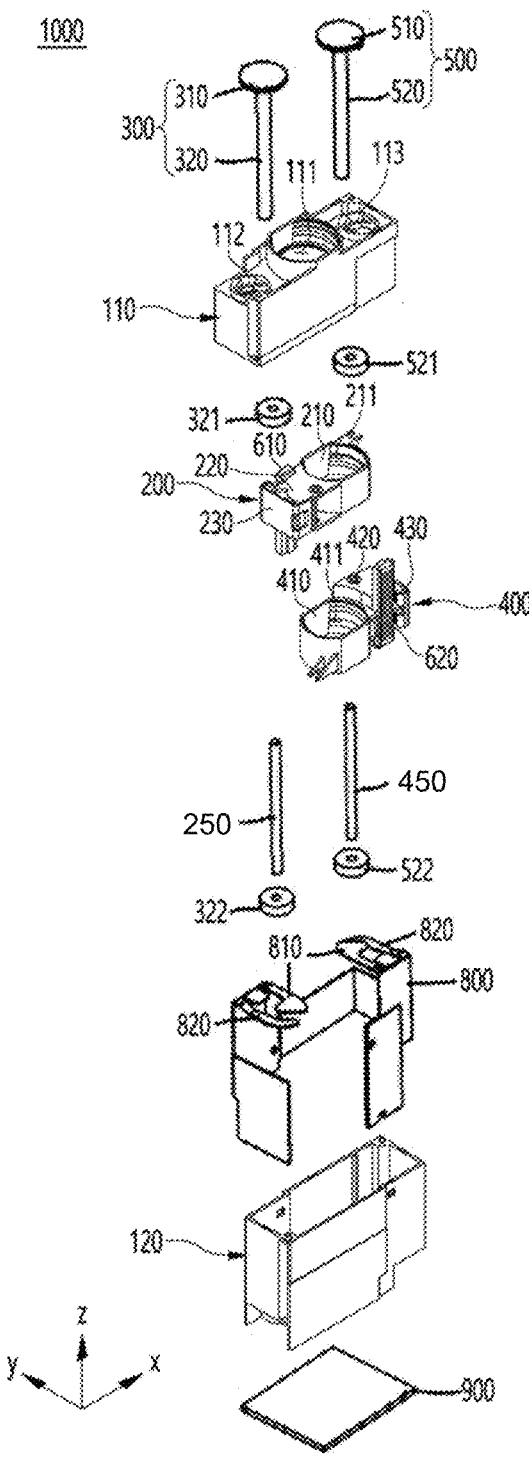

【FIG. 3】
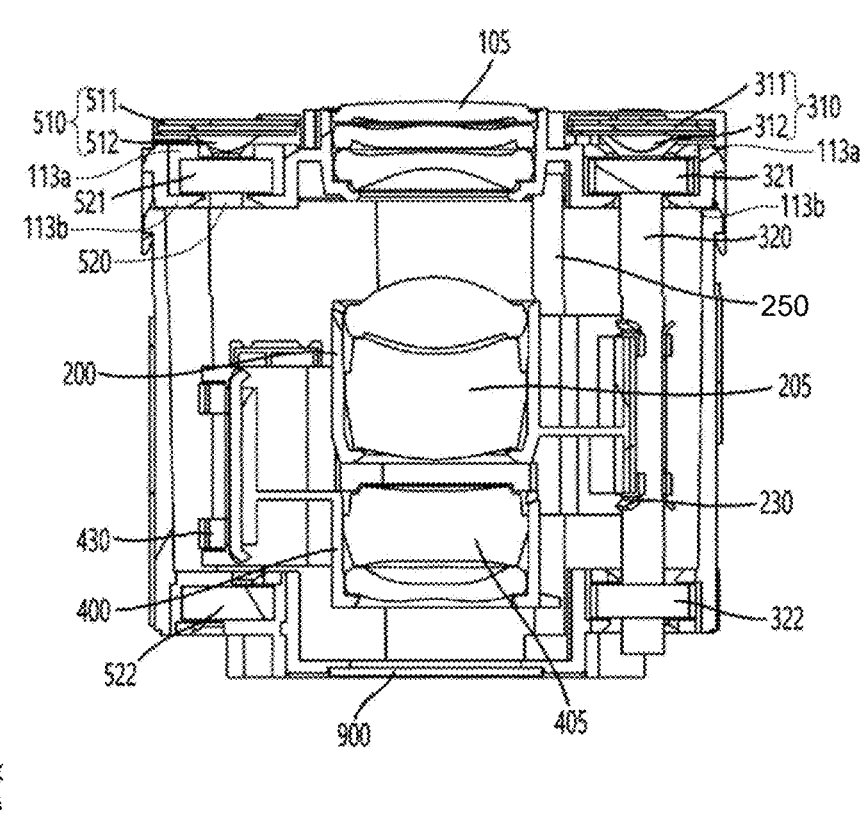
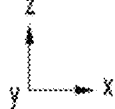

【FIG. 4】
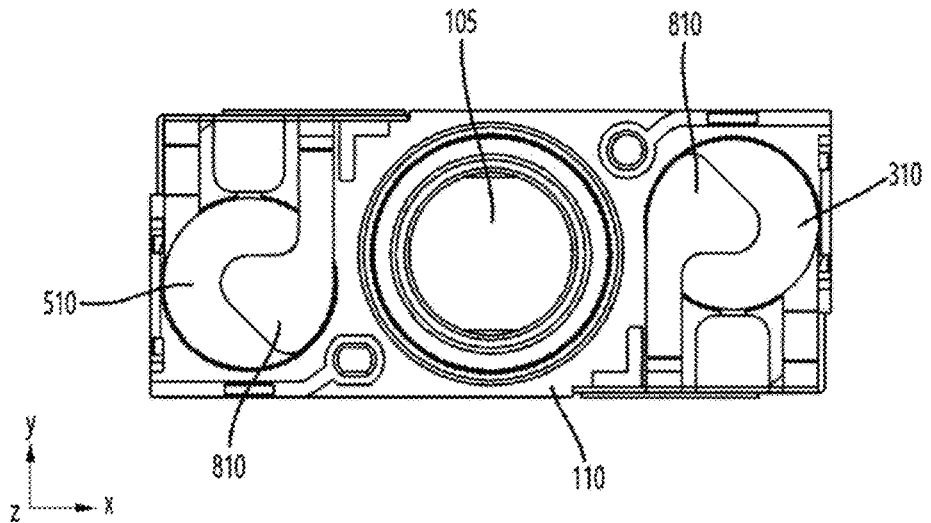
【FIG. 5】
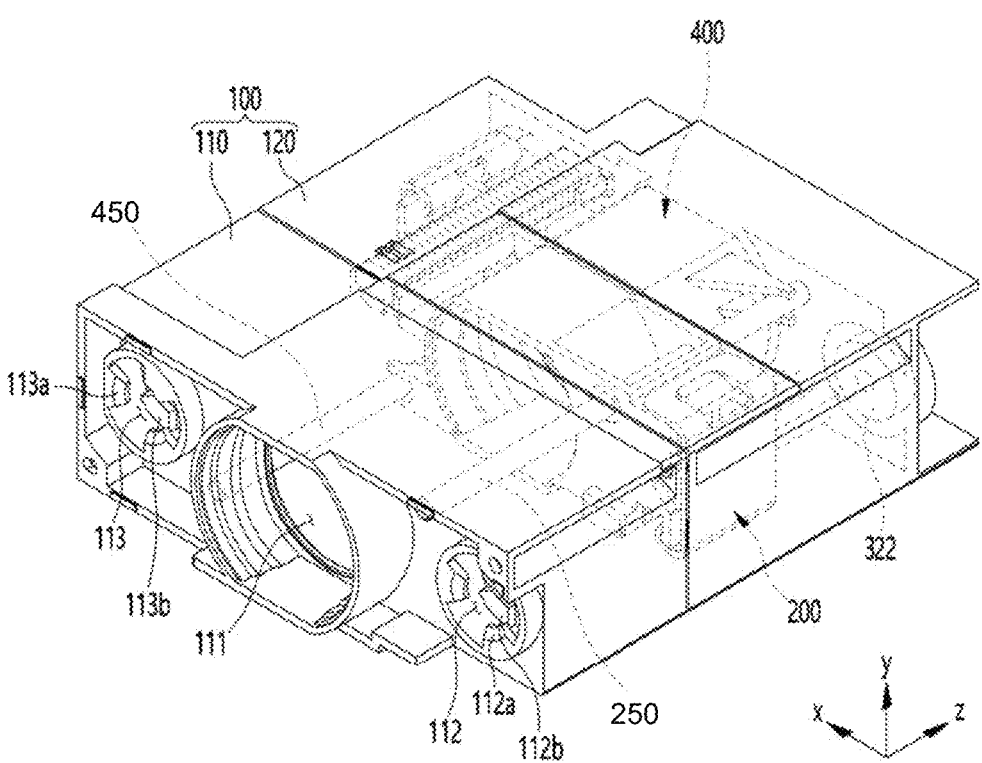

【FIG. 6】
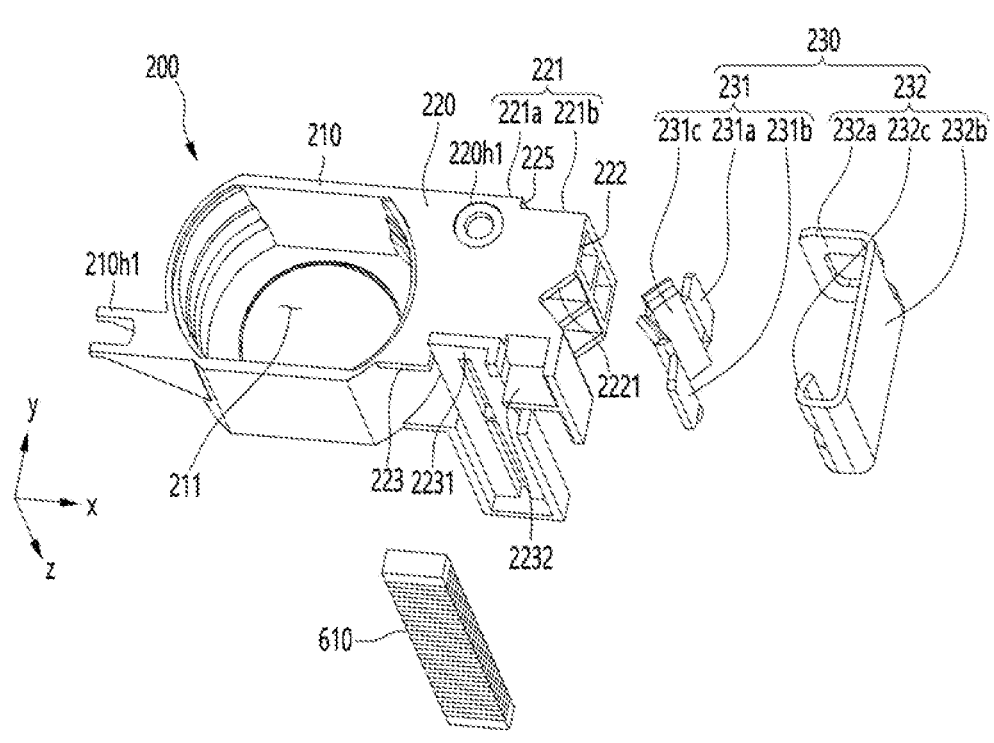

【FIG. 7】
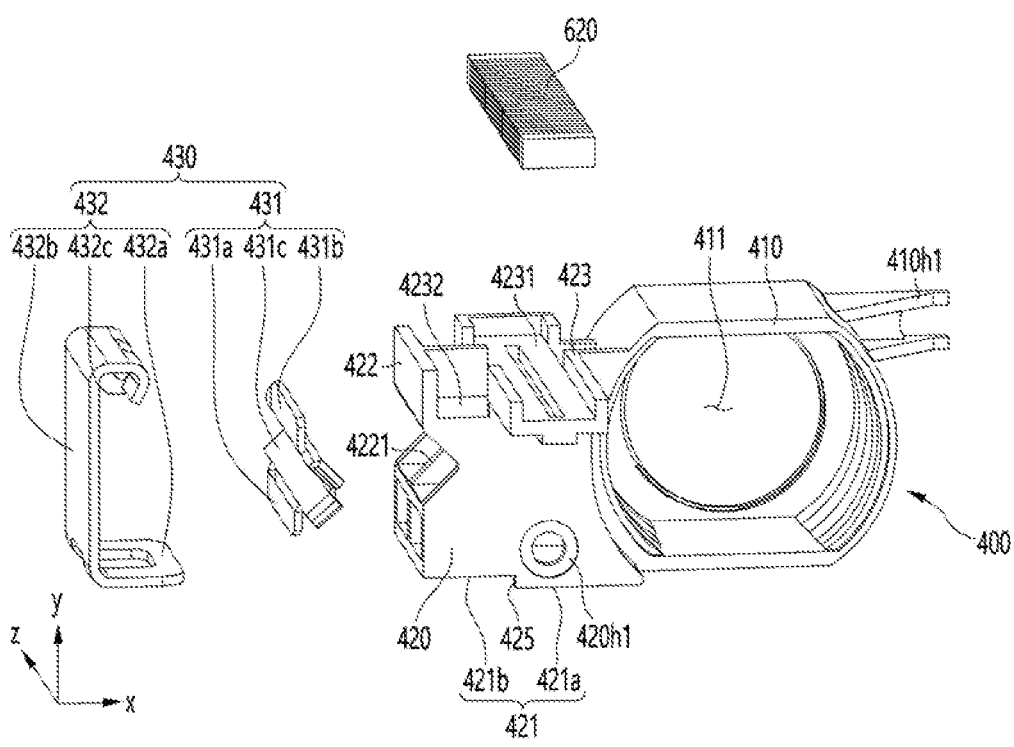
【FIG. 8】
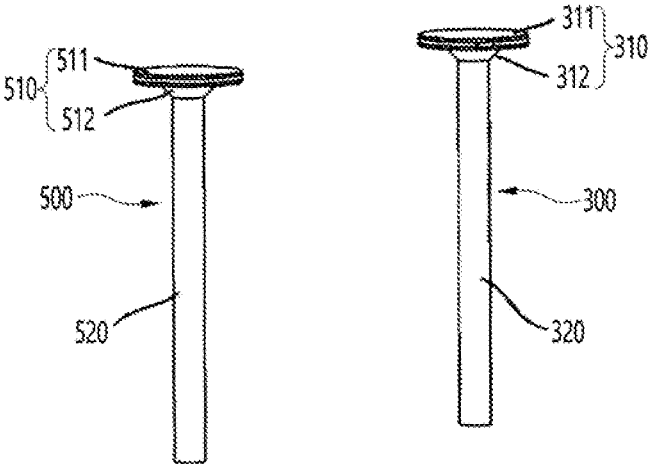

【FIG. 9】
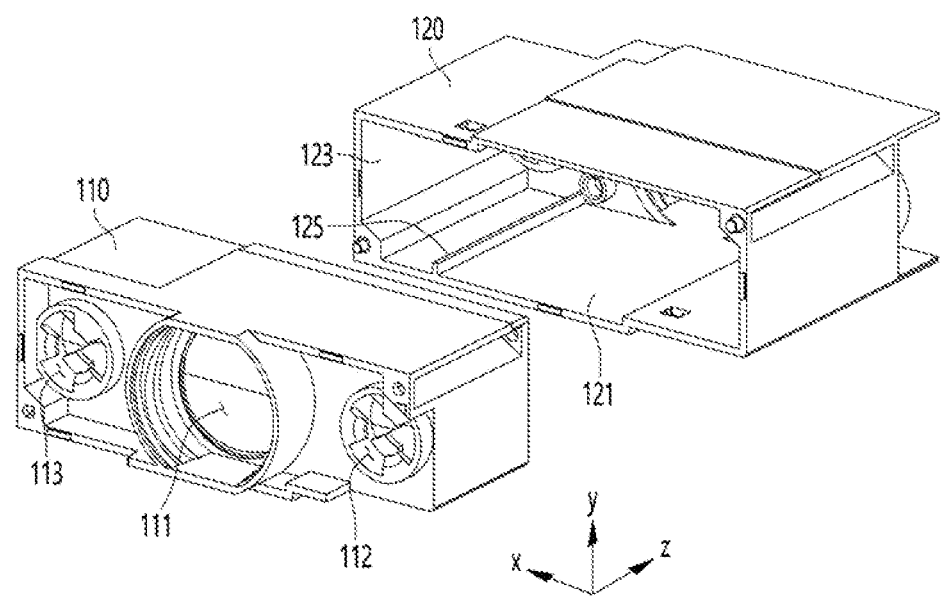
【FIG. 10】
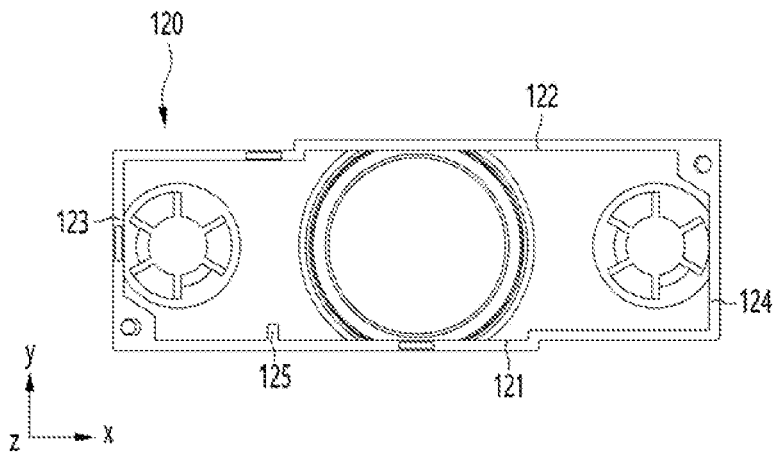

【FIG. 11】
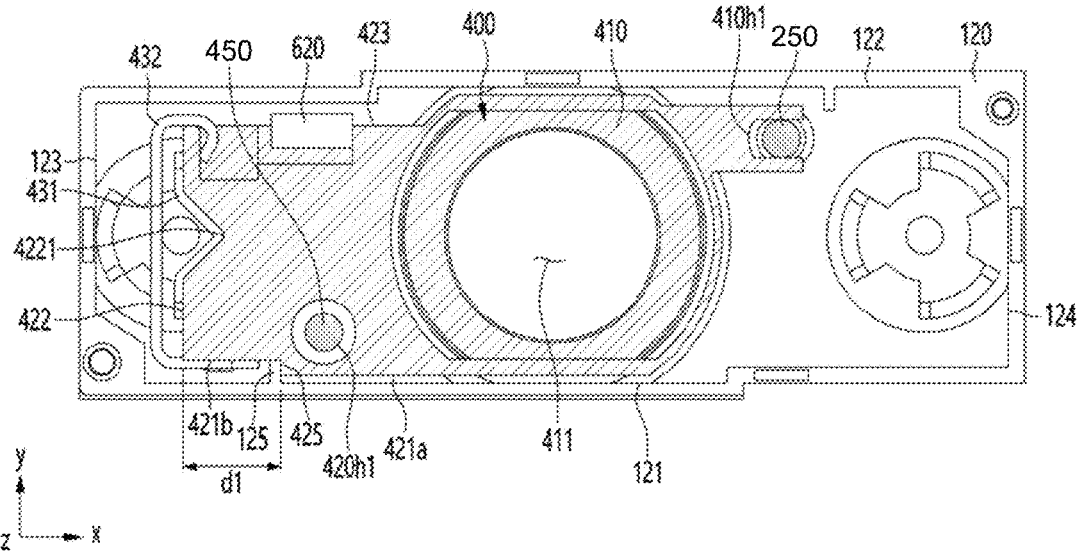
【FIG. 12】
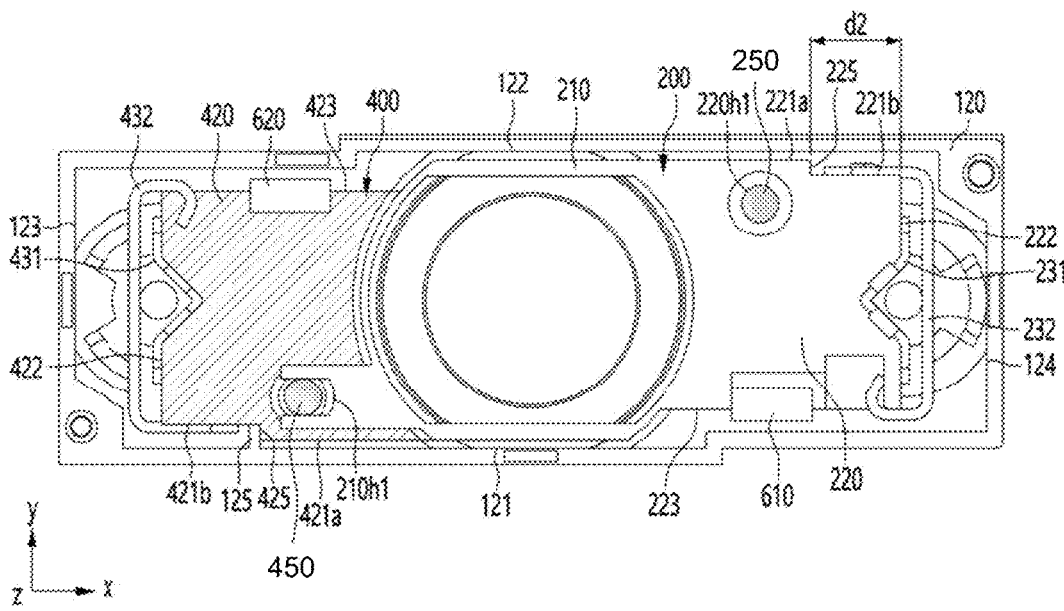

【FIG. 13】
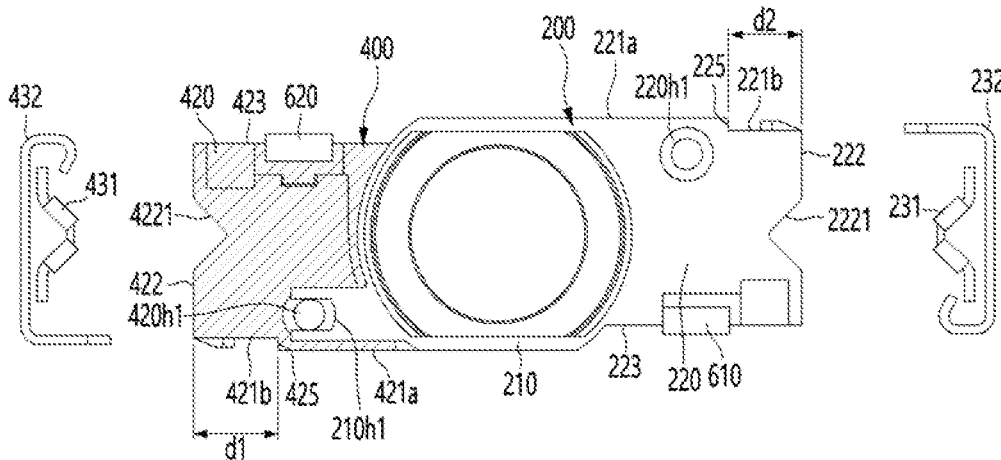
【FIG. 14】
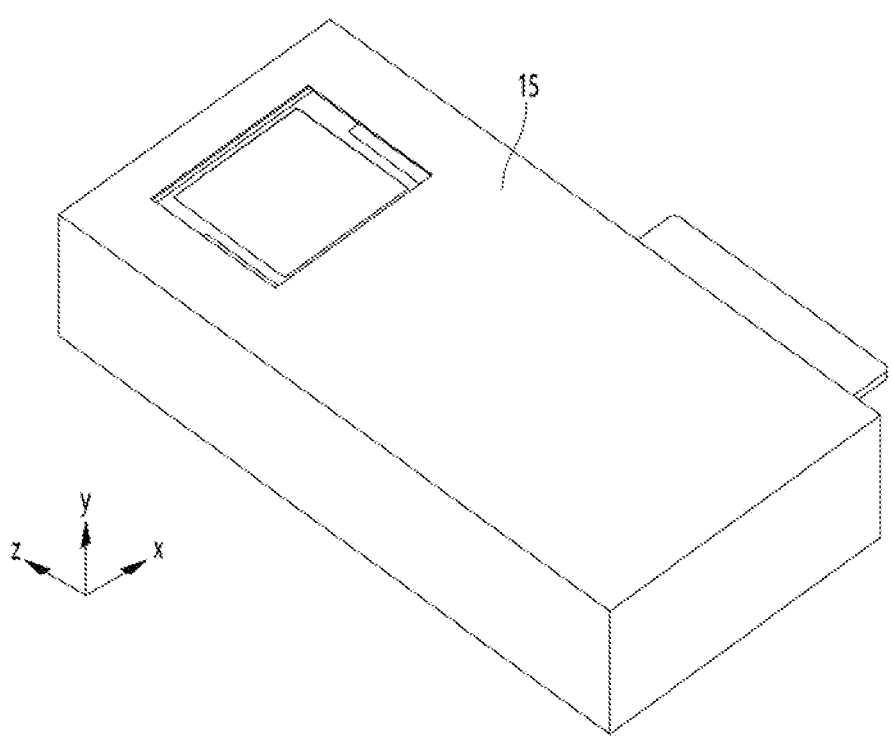

【FIG. 15】
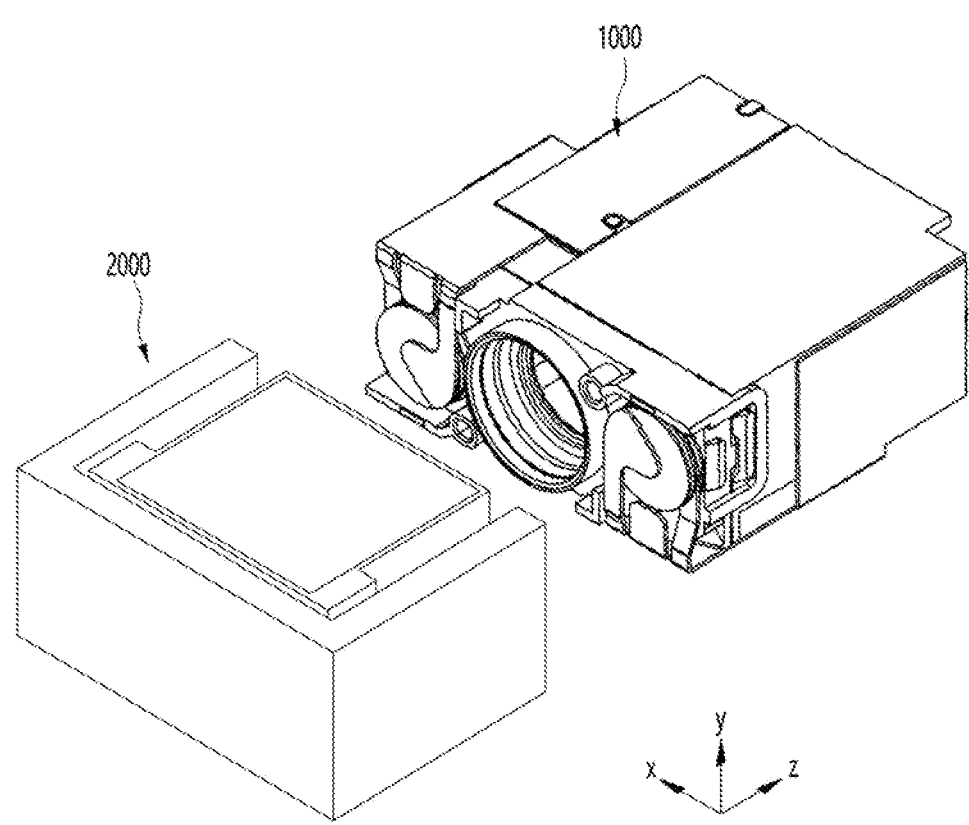

【FIG. 16】
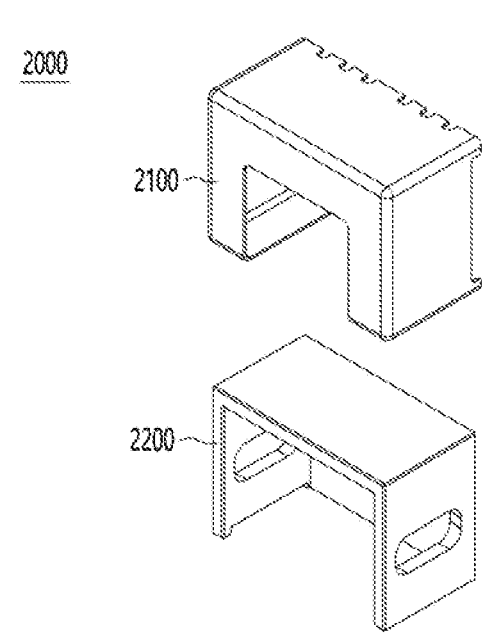
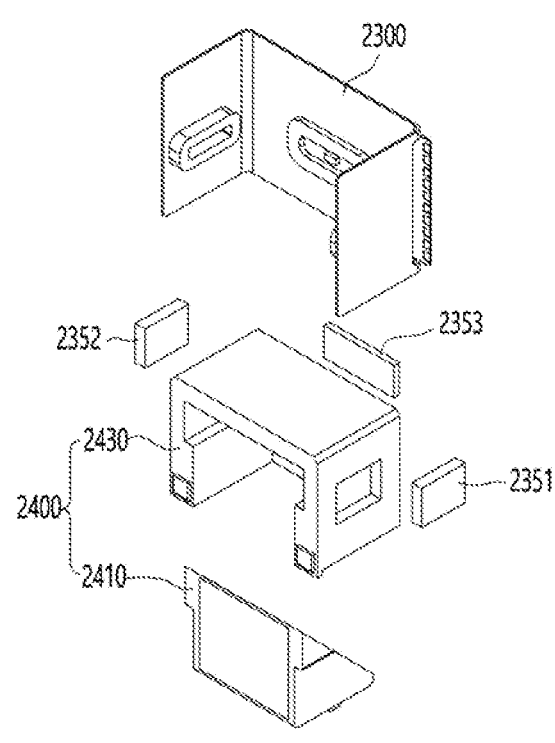

【FIG. 17】
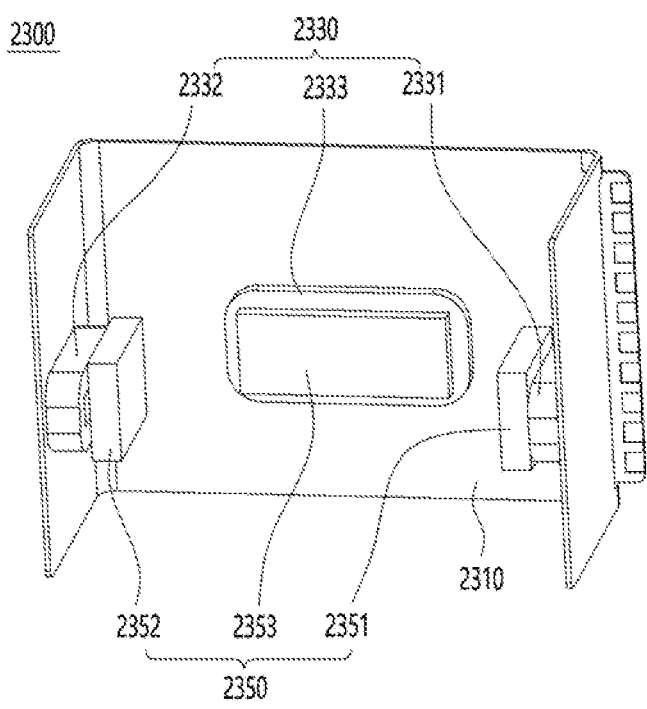

【FIG. 18】
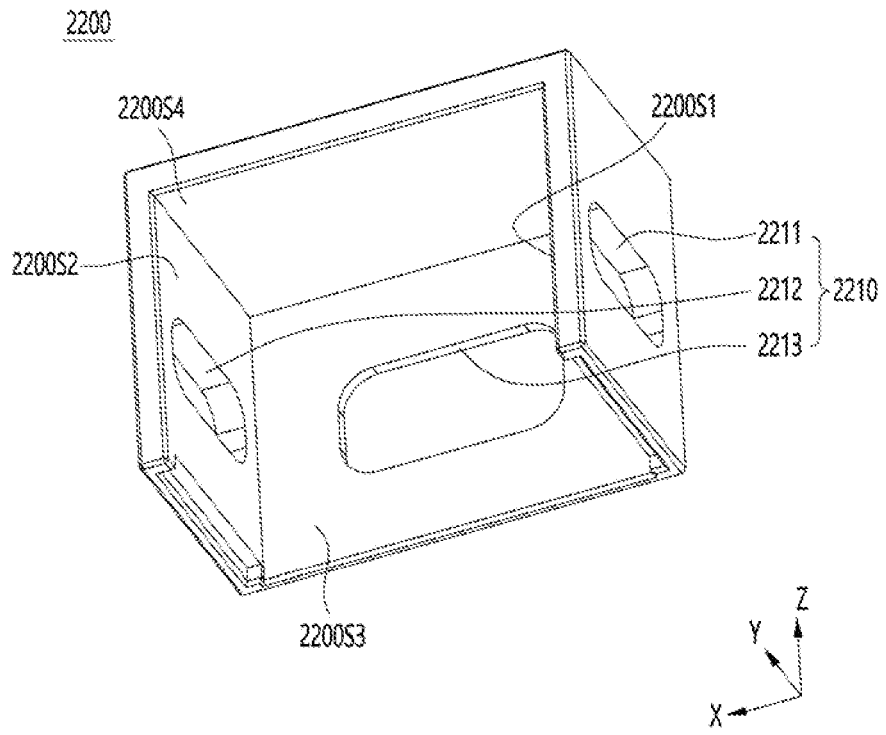

【FIG. 19】
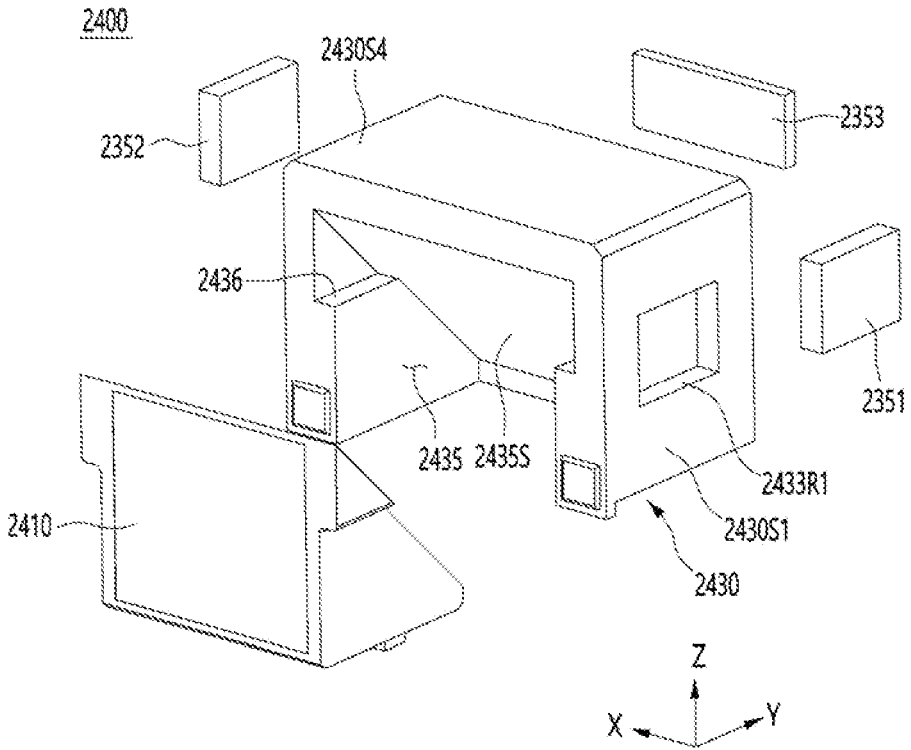
【FIG. 20】
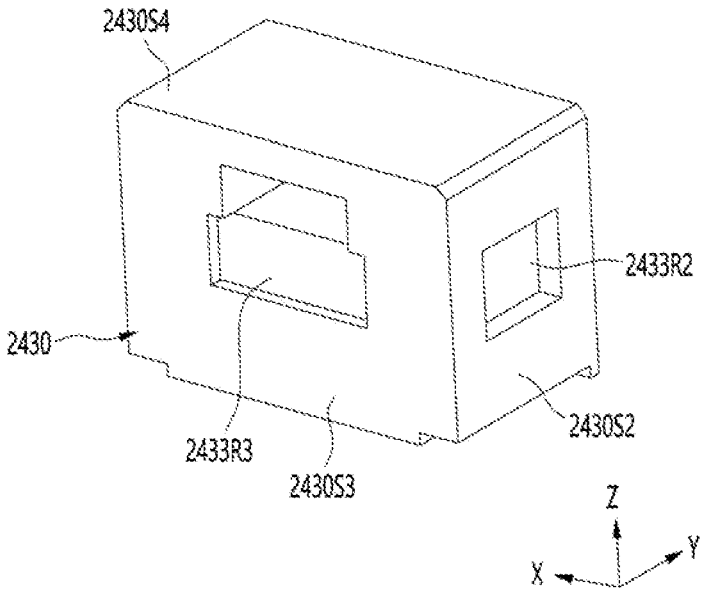

【FIG. 21】
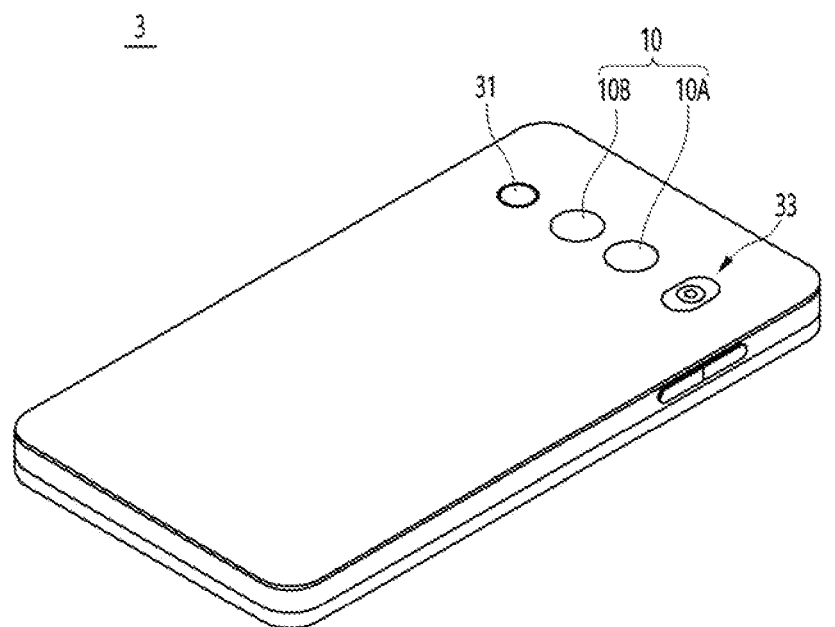

【FIG. 22】
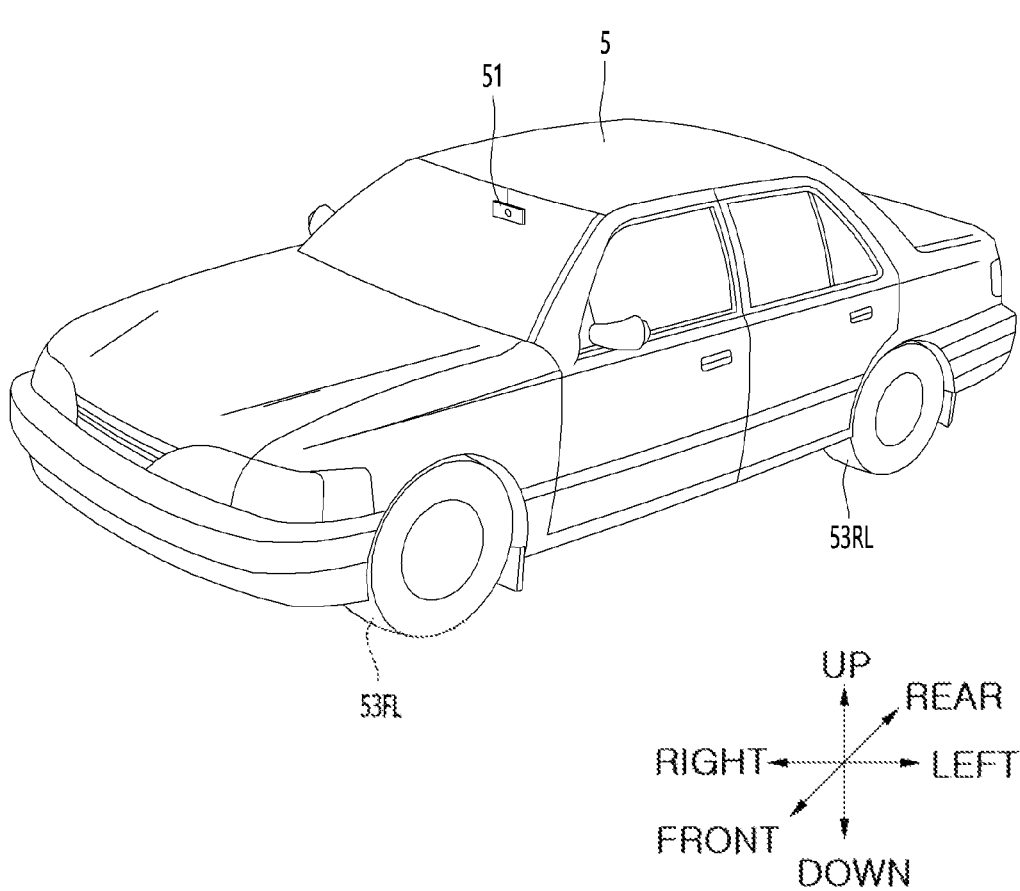

CAMERA ACTUATOR AND CAMERA MODULE INCLUDING SAME

CROSS REFERENCE TO RELATED APPLICATIONS

This application is the National Phase of PCT International Application No. PCT/KR2021/004447, filed on Apr. 8, 2021, which claims priority under 35 U.S.C. 119 (a) to Patent Application No. 10-2020-0043389, filed in the Republic of Korea on Apr. 9, 2020, all of which are hereby expressly incorporated by reference into the present application.

TECHNICAL FIELD

An embodiment relates to a camera actuator and a camera module.

BACKGROUND ART

A camera module captures a subject and stores it as an image or video, and is installed in various devices such as mobile terminals such as cell phones, laptops, drones, and vehicles.

In general, the device described above is equipped with a miniature camera module, and the camera module can perform an autofocus (AF) function of automatically adjusting the distance between the image sensor and the lens to align the focal lengths of the lenses. In addition, the camera module may perform a zooming function of zooming up or zooming out by increasing or decreasing the magnification of a distant subject through a zoom lens.

In addition, recent camera modules employ image stabilization (IS) technology to correct or prevent image stabilization due to camera movement caused by an unstable fixing device or a user's movement.

Such image stabilization (IS) technology includes an optical image stabilizer (OIS) technology and an image stabilization prevention technology using an image sensor. Here, OIS technology is a technology that corrects motion by changing the path of light, and the image stabilization prevention technology using the image sensor is a technology that compensates for motion in both mechanical and electronic ways, and recently, OIS technology is being adopted more and more.

Meanwhile, a zoom actuator is used for a zooming function in the camera module. However, friction torque is generated when the lens is moved due to the mechanical movement of the actuator, and problems such as a decrease in driving force, an increase in power consumption, and a decrease in control characteristics occur due to the friction torque.

In particular, in order to derive the optical properties, not only alignment between a plurality of lens groups but also alignment of a plurality of lens groups with the image sensor must be well matched. However, when the center of the spherical surface between the lens groups deviates from the optical axis, tilt, which is a lens inclination phenomenon, or a phenomenon that the central axis of the lens group and the image sensor is not aligned, there is a problem in that the image quality or resolution is deteriorated because the angle of view is changed or the focus is out of focus.

In addition, when increasing the separation distance in a region where friction is generated to reduce friction torque resistance when moving the lens for the zoom function in the camera module, there is a technical problem in that a lens descent or a lens tilt is deepened when the zoom movement or the zoom movement is reversed.

Also, the plurality of zoom lens groups may have a shape similar to or symmetrical to each other. For this reason, when assembling the plurality of zoom lenses, there is a problem in that a set zoom lens group is not assembled first, but another zoom lens group having a similar or symmetrical shape is assembled first. In this case, since the plurality of zoom lens groups are arranged differently from the set positions, there is a problem in that the overall optical characteristics are deteriorated or the driving is not performed.

Therefore, a new camera module capable of solving the above problems is required.

DISCLOSURE

Technical Problem

An embodiment provides a camera actuator and a camera module having improved optical properties.

In addition, the embodiment provides a camera actuator and a camera module capable of autofocus and high magnification zoom.

In addition, the embodiment provides a camera actuator and a camera module capable of preventing problems such as de-centering, tilting, and friction occurring when a lens group is moved.

In addition, the embodiment provides a camera actuator and a camera module that can have improved process efficiency.

Technical Solution

A camera actuator according to an embodiment comprises a first lens unit disposed in a housing; a first lens barrel disposed in the housing and disposed under the first lens unit; a second lens barrel disposed in the housing and disposed under the first lens barrel; a first driving unit coupled to the first lens barrel in the housing and moving the first lens barrel in an optical axis direction; and a second driving unit coupled to the second lens barrel in the housing and moving the second lens barrel in the optical axis direction, wherein each of the first and second lens barrels includes an upper surface, a lower surface, and side surfaces facing an inner upper surface, an inner lower surface, and an inner side surfaces of the housing, wherein the upper surface of the first lens barrel includes a first stepped portion, wherein the lower surface of the second lens barrel includes a second stepped portion, and wherein a first distance from one side surface of the second lens barrel to the second stepped portion is different from a second distance from one side surface of the first lens barrel to the first stepped portion.

In addition, the first distance is greater than the second distance.

In addition, the housing includes a guide jaw disposed on the inner lower surface of the housing, and wherein the guide jaw extends in the optical axis direction and is disposed in a region corresponding to the second stepped portion.

In addition, the housing includes a first housing in which the first lens unit is disposed; and a second housing under the first housing and in which the first lens barrel and the second lens barrel are disposed.

In addition, a length of the guide jaw relative to the optical axis direction is less than or equal to a length of an inner lower surface of the second housing.

In addition, the first lens barrel includes: a first barrel portion including a second lens unit; a first guide portion extending outwardly from the first barrel portion; and a first elastic portion connected to the first driving unit, wherein the second lens barrel includes: a second barrel portion including a third lens unit; a second guide portion extending outwardly from the second barrel portion; and a second elastic portion connected to the second driving unit.

In addition, the first driving unit includes: a first piezoelectric device disposed in the housing; and a first extension bar extending from the first piezoelectric device in the optical axis direction, wherein the second driving unit includes: a second piezoelectric device disposed in the housing; and a second extension bar extending from the second piezoelectric device in the optical axis direction, wherein one region of the first extension bar is connected to the first elastic portion, and wherein one region of the second extension bar is connected to the second elastic portion.

In addition, the camera actuator further includes first and second pins extending in the optical axis direction within the housing and spaced apart from each other, wherein the first pin is disposed to be inserted into a first insertion hole of the first lens barrel, wherein the second pin is disposed to be inserted into a second insertion hole of the second lens barrel, wherein the first lens barrel moves along the first pin, and wherein the second lens barrel moves along the second pin.

In addition, the first lens barrel further includes a first guide groove in which the second pin is disposed, wherein the second lens barrel further includes a second guide groove in which the first pin is disposed, wherein each of the first and second guide grooves has an open shape at one side.

In addition, the camera actuator further comprises a first magnetic scaler disposed on the lower surface of the first lens barrel; a first sensing unit disposed adjacent to the first magnetic scaler; a second magnetic scaler disposed on the upper surface of the second lens barrel; and a second sensing unit disposed adjacent to the second magnetic scaler.

In addition, the camera actuator according to the embodiment comprises a housing, a first lens unit disposed in the housing; a first lens barrel disposed in the housing and disposed under the first lens unit; a second lens barrel disposed in the housing and disposed under the first lens barrel; a first driving unit coupled to the first lens barrel in the housing and moving the first lens barrel in an optical axis direction; and a second driving unit coupled to the second lens barrel in the housing and moving the second lens barrel in the optical axis direction, wherein the housing includes an inner lower surface facing a lower surface of each of the first and second lens barrels, wherein a guide jaw is disposed on the inner lower surface of the housing and protrudes in an inner upper surface direction, and wherein the guide jaw is disposed in a region overlapping the second lens barrel without overlapping the first lens barrel.

In addition, the lower surface of the second lens barrel includes a first sub lower surface, a second sub lower surface disposed above the first sub lower surface, and a second stepped portion connecting between the first and second sub lower surfaces, and wherein the guide jaw is disposed in a region corresponding to the second sub lower surface.

In addition, an upper surface of the guide jaw is disposed above the first sub lower surface.

In addition, the upper surface of the first lens barrel includes a first sub upper surface, a second sub upper surface disposed below the first sub upper surface, and a first stepped portion connecting between the first and second sub upper surfaces.

In addition, a first distance from one side of the second lens barrel to the second stepped portion is different from a second distance from one side of the first lens barrel to the first stepped portion.

In addition, the first distance may be longer than the second distance.

In addition, the camera module according to the embodiment includes a first camera actuator and a second camera actuator, wherein the first camera actuator performs an auto focusing or zoom function, and the second camera actuator performs an OIS (Optical Image Stabilizer) function.

In addition, light incident on the camera module from an outside is incident on the first camera actuator through the second camera actuator.

Advantageous Effects

The camera actuator and the camera module according to the embodiment may have improved optical properties. In detail, the camera actuator and camera module according to the embodiment includes a driving unit for moving the lens group including a piezoelectric device, the lens group can be more precisely controlled by the driving unit, and friction generated when the lens group is moved can be minimized. Accordingly, the embodiment may provide more improved autofocus and zoom functions.

In addition, the camera actuator and the camera module according to the embodiment may have improved process efficiency. In detail, the camera actuator and the camera module according to the embodiment include a housing accommodating a plurality of lens groups, for example, a plurality of lens barrels, and a guide jaw may be disposed on an inner lower surface of the housing facing the lens barrels. In this case, the guide jaw may have a position corresponding to a set lens barrel among the plurality of lens barrels and a corresponding distance, thereby preventing an unset lens barrel from being disposed. Accordingly, it is possible to effectively arrange the set lens barrel at the set position, and it is possible to prevent other lens barrels from being misplaced. Accordingly, the embodiment may reduce defects caused by misplacement of the plurality of lens barrels, and may have improved process efficiency.

DESCRIPTION OF DRAWINGS

FIG. 1 is a perspective view of a camera actuator according to an embodiment.

FIG. 2 is an exploded perspective view of a camera actuator according to an embodiment.

FIG. 3 is a cross-sectional view of a camera actuator according to an embodiment.

FIG. 4 is a front view of a camera actuator according to an embodiment.

FIG. 5 is a perspective view showing first and second driving units disposed in a housing in a camera actuator according to an embodiment.

FIG. 6 is an exploded perspective view of a first driving unit according to an embodiment.

FIG. 7 is an exploded perspective view of a second driving unit according to an embodiment.

FIG. 8 is a perspective view of a part of the camera actuator according to the embodiment.

FIG. 9 is an exploded perspective view of a housing according to the embodiment.

FIG. 10 is a front view of a second housing according to an embodiment.

FIG. 11 is a front view of a second driving unit disposed in a second housing according to an exemplary embodiment.

FIG. 12 is a front view in which first and second driving units are disposed in a second housing according to an embodiment.

FIG. 13 is a view showing first and second driving units according to an embodiment.

FIG. 14 is a perspective view of a camera module according to an embodiment.

FIG. 15 is a perspective view in which some components are omitted from the camera module according to the embodiment.

FIG. 16 is an exploded perspective view of a second camera actuator according to an embodiment.

FIG. 17 is a diagram of a third driving unit of a second camera actuator according to an embodiment.

FIG. 18 is a view of a third housing of a second camera actuator according to an embodiment.

FIGS. 19 and 20 are views of a prism unit of a second camera actuator according to an embodiment.

FIG. 21 is a perspective view of a mobile terminal to which a camera module according to an embodiment is applied.

FIG. 22 is a perspective view of a vehicle to which a camera module according to an embodiment is applied.

MODES OF THE INVENTION

Hereinafter, embodiments of the present invention will be described in detail with reference to the accompanying drawings.

However, the spirit and scope of the present invention is not limited to a part of the embodiments described, and may be implemented in various other forms, and within the spirit and scope of the present invention, one or more of the elements of the embodiments may be selectively combined and substituted for use.

In addition, unless expressly otherwise defined and described, the terms used in the embodiments of the present invention (including technical and scientific terms may be construed the same meaning as commonly understood by one of ordinary skill in the art to which this invention belongs, and the terms such as those defined in commonly used dictionaries may be interpreted as having a meaning that is consistent with their meaning in the context of the relevant art.

Further, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements. In addition, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements.

In addition, when described as being formed or disposed "on (over)" or "under (below)" of each element, the "on (over)" or "under (below)" may include not only when two elements are directly connected to each other, but also when one or more other elements are formed or disposed between two elements. Further, when expressed as "on (over)" or "under (below)", it may include not only the upper direction but also the lower direction based on one element.

An optical axis direction used below may be defined as an optical axis direction of a lens coupled to a camera actuator and a camera module, and a vertical direction may be defined as a direction perpendicular to the optical axis.

A autofocus function used below may be defined a function to automatically focus on the subject by adjusting the distance from the image sensor by moving the lens in the optical axis direction according to the distance of the subject so that a clear image of the subject can be obtained by the image sensor.

Meanwhile, the auto focus may correspond to auto focus (AF). In addition, closed-loop auto focus (CLAF) control may be defined as real-time feedback control of the lens position by sensing the distance between the image sensor and the lens to improve focus adjustment accuracy.

In addition, before the description of the embodiment of the invention, a first direction may mean a x-axis direction shown in the drawings, a second direction may be a different direction from the first direction. For example, the second direction may mean a y-axis direction shown in the drawing in a direction perpendicular to the first direction. Also, a third direction may be different from the first and second directions. For example, the third direction may mean a z-axis direction shown in the drawing in a direction perpendicular to the first and second directions. Here, the third direction may mean an optical axis direction.

Hereinafter, the configuration of the camera module according to the present embodiment will be described with reference to the drawings.

FIG. 1 is a perspective view of a camera actuator according to an embodiment, FIG. 2 is an exploded perspective view of a camera actuator according to an embodiment, FIG. 3 is a cross-sectional view of a camera actuator according to an embodiment, FIG. 4 is a front view of a camera actuator according to an embodiment, FIG. 5 is a perspective view showing first and second driving units disposed in a housing in a camera actuator according to an embodiment, FIG. 6 is an exploded perspective view of a first driving unit according to an embodiment, FIG. 7 is an exploded perspective view of a second driving unit according to an embodiment, FIG. 8 is a perspective view of a part of the camera actuator according to the embodiment.

Referring to FIGS. 1 to 8, the camera actuator 1000 according to the embodiment may include a housing 100, a first lens unit 105, a first lens barrel 200, a first driving unit 300, a second lens barrel 400 and a second driving unit 500.

The housing 100 may form the exterior of the camera actuator 1000. The housing 100 may have upper and lower partial regions open and may have a hexahedral shape.

The housing 100 may include an accommodating space therein. The first lens barrel 200, the first driving unit 300, the second lens barrel 400, and the second driving unit 500 may be accommodated in the accommodating space of the housing 100.

The housing 100 may include a first housing 110 and a second housing 120.

The first housing 110 may include a first hole 111. The first hole 111 may be formed on one side of the first housing 110. The first hole 111 may be a hollow hole passing through an outside and an inside of the first housing 110.

The first housing 110 may further include a second hole 112 and a third hole 113. The second hole 112 and the third hole 113 may be disposed on one side of the first housing 110. The second hole 112 and the third hole 113 may be hollow holes passing through the outside and the inside of the first housing 110. The second hole 112 and the third hole 113 may be spaced apart from the first hole 111. In detail, the first hole 111 may be disposed between the second hole 112 and the third hole 113. The first hole 111 may be disposed at equal intervals to the second hole 112 and the third hole 113.

The second hole 112 may include a plurality of protrusions protruding from an inner circumferential surface of the second hole 112 toward a center of the second hole 112. For example, the plurality of protrusions may include a first protrusion 112a disposed at an upper end of the second hole 112 and a second protrusion 112b disposed at a lower end of the second hole 112 in the optical axis direction.

In detail, the first protrusion 112a may include a plurality of first sub-protrusions (not shown) spaced apart from each other. The plurality of first sub-protrusions may be arranged at equal intervals from the center of the second hole 112 along a circumference of a concentric circle shape. Also, the second protrusion 112b may be spaced apart from the first protrusion 112a in the optical axis direction. The second protrusion 112b may be disposed below the first protrusion 112a. The second protrusion 112b may include a plurality of second sub-protrusions (not shown) spaced apart from each other. The plurality of second sub-protrusions may be arranged at equal intervals from the center of the second hole 112 along a circumference of a concentric circle shape. The first protrusion 112a and the second protrusion 112b may provide a space in which a portion of the first driving unit 300 to be described later, for example, a first buffer member 321 is disposed.

The third hole 113 may include a plurality of protrusions protruding from the inner circumferential surface of the third hole 113 toward the center of the third hole 113. The plurality of protrusions may include a third protrusion 113a disposed at an upper end of the third hole 113 and a fourth protrusion 113b disposed at a lower end of the third hole 113 with respect to the optical axis direction.

The third protrusion 113a may include a plurality of third sub-protrusions (not shown) spaced apart from each other. The plurality of third sub-protrusions may be arranged at equal intervals from the center of the third hole 113 along the circumference of a concentric circle. Also, the fourth protrusion 113b may be spaced apart from the third protrusion 113a in the optical axis direction. The fourth protrusion 113b may include a plurality of fourth sub-protrusions (not shown) spaced apart from each other. The plurality of fourth sub-protrusions may be arranged at equal intervals from the center of the third hole 113 along the circumference of a concentric circle. The third protrusion 113a and the fourth protrusion 113b may provide a space in which a portion of the second driving unit 500 to be described later, for example, a third buffer member 521 is disposed.

The second housing 120 may be disposed under the first housing 110. In detail, the second housing 120 may be disposed under the first housing 110 in a third direction (z-axis, optical-axis direction). The second housing 120 may be disposed closer to the image sensor 900 to be described later than the first housing 110. The first lens barrel 200, the first driving unit 300, the second lens barrel 400, and the second driving unit 500 may be disposed in the second housing 120.

The second housing 120 may be coupled to the first housing 110. For example, the first housing 110 and the second housing 120 may be coupled by a separate fastening member (not shown) such as a screw. In addition, the first housing 110 and the second housing 120 may be coupled to each other by physical coupling of coupling jaws and coupling grooves respectively formed therein.

The first lens unit 105 is disposed in the housing 100 and may include at least one lens. For example, the first lens unit 105 may be disposed in the first housing 110. In detail, the first lens unit 105 may be disposed in the first hole 111 of the first housing 110. For example, the first lens unit 105 may be coupled to the first housing 110 by a thread formed on an inner circumferential surface of the first hole 111.

The first lens barrel 200 may be disposed in the housing 100. The first lens barrel 200 may be disposed in the second housing 120. The first lens barrel 200 may be disposed under the first lens unit 105. For example, the first lens barrel 200 may be disposed below the first lens unit 105 in the optical axis direction, and may be closer to the image sensor 900 than the first lens unit 105. The first lens barrel 200 may be coupled to the first driving unit 300. The first lens barrel 200 may be moved in the housing 100 by the first driving unit 300. In detail, the first lens barrel 200 may be moved in the optical axis direction by the first driving unit 300.

The first lens barrel 200 may include a first barrel portion 210, a second lens unit 205, a first guide portion 220, and a first elastic portion 230.

The first barrel portion 210 may be disposed in a region overlapping the optical axis and may have an open shape on one surface and the other surface. For example, the first barrel portion 210 may have a cylindrical shape in which one surface and the other surface are open.

The first barrel portion 210 may include the first through hole 211. The first through hole 211 may be a through hole penetrating through one surface and the other surface of the first barrel portion 210. Here, one surface of the first barrel portion 210 may be a surface facing the first lens unit 105, and the other surface may be a surface opposite to the one surface and facing the image sensor 900.

The second lens unit 205 may be disposed on the first barrel portion 210. In detail, the second lens unit 205 may be disposed in the first through hole 211. For example, a screw line may be formed on an inner circumferential surface of the first through hole 211, and the second lens unit 205 may be coupled to the first barrel portion 210 by the screw line.

The second lens unit 205 may include at least one lens. The second lens unit 205 may perform a zoom function. The second lens unit 205 may move in the optical axis direction. In detail, the second lens unit 205 may move in the optical axis direction with respect to the first lens unit 105.

The first guide portion 220 may extend outwardly from the first barrel portion 210. For example, the first guide portion 220 may extend from the first barrel portion 210 in a direction perpendicular to the optical axis, for example, in a first direction (x-axis direction).

The first guide portion 220 may include a first upper surface 221, a first side surface 222, and a first lower surface 223.

The first upper surface 221 may face an inner upper surface 122 of the housing 100 to be described later. The first upper surface 221 may face the inner upper surface 122 of the housing 100 in the second direction (y-axis direction). The first upper surface 221 may include a plurality of sub upper surfaces. In detail, the first upper surface 221 may include a first sub upper surface 221a and a second sub upper surface 221b disposed lower in the second direction (y-axis direction) than the first sub upper surface 221a. That is, the second sub upper surface 221b may be disposed adjacent to the first lower surface 223 than the first sub upper surface 221a. At least one first fastening protrusion (not shown) may be disposed on the second sub upper surface 221b. The first fastening protrusion may have a shape protruding upward on the second sub upper surface 221b. The first fastening protrusion may be inserted into a first fixing groove (not shown) formed in a first elastic portion 230 to be described later.

Also, the first upper surface 221 may include a first stepped surface 225 disposed between the first sub upper surface 221a and the second sub upper surface 221b. The first stepped surface 225 may be connected to ends of the first sub upper surface 221a and the second sub upper surface 221b. The first stepped surface 225 may be defined as the first stepped portion 225. That is, the first upper surface 221 may include the first sub upper surface 221a, the second sub upper surface 221b, and the first stepped portion 225 and may have a stepped structure.

The first lower surface 223 may face the inner lower surface 121 of the housing 100 to be described later. A first groove 2231 may be disposed on the first lower surface 223. The first groove 2231 may have a concave shape in a direction from the first lower surface 223 to the first upper surface 221. A first magnetic scaler 610 to be described later may be disposed in the first groove 2231.

In addition, a second groove 2232 may be disposed on the first lower surface 223. The second groove 2232 may be spaced apart from the first groove 2231. The second groove 2232 may be disposed in an edge region of the first lower surface 223. The second groove 2232 may provide a region in which a portion of the first elastic portion 230, which will be described later, is disposed. In detail, the second groove 2232 may provide a region in which the first elastic portion 230 is mounted and fixed.

The first side surface 222 may be disposed between the first upper surface 221 and the first lower surface 223. In detail, the first side surface 222 may be a surface connecting the first upper surface 221 and the first lower surface 223. In more detail, the first side surface 222 may be a surface connecting the second sub upper surface 221b and the first lower surface 223. The first side surface 222 may face a second inner surface 124 of the second housing 120 to be described later.

A first recess 2221 may be disposed on the first side surface 222. The first recess 2221 may have a concave shape in a direction from the first side surface 222 to the first barrel portion 210. Also, the first recess 2221 may have a groove shape extending in the optical axis direction (z-axis direction). The first recess 2221 may have a V-shape when viewed from the front.

The first guide portion 220 may include a first insertion hole 220h1. The first insertion hole 220h1 may be a hole passing through one surface and the other surface of the first guide portion 220. Here, one surface of the first guide portion 220 may be a surface facing the first lens unit 105, and the other surface may be a surface opposite to the one surface and facing the image sensor 900.

A first pin 250 may be disposed in the first insertion hole 220h1. The first pin 250 may be disposed to pass through the first insertion hole 220h1. The first pin 250 has a shape extending in the optical axis direction (z-axis direction), and may have a longer optical axis direction length than the first lens barrel 200. The first pin 250 may be coupled to at least one of the first housing 110 and the second housing 120. The first lens barrel 200 may move along the first pin 250 as a movement axis in the optical axis direction. Through this, the second lens unit 205 disposed in the first lens barrel 200 may perform a zoom function and/or an autofocus function.

The first elastic portion 230 may be disposed on the first guide portion 220. For example, the first elastic portion 230 may be disposed on the first upper surface 221, the first lower surface 223, and the first side surface 222 of the first guide portion 220. The first elastic portion 230 may be coupled to the first guide portion 220.

The first elastic portion 230 may include a first elastic member 231 and a second elastic member 232.

The first elastic member 231 may be coupled to the first guide portion 220. The first elastic member 231 may be disposed at a set position on the first side surface 222.

The first elastic member 231 may have a shape corresponding to the first side surface 222. For example, the first elastic member 231 may include a first region 231a, a second region 231b, and a third region 231c.

The first region 231a and the second region 231b may be disposed on the first side surface 222 of the first guide portion 220 and may be spaced apart from each other. The first region 231a and the second region 231b may be disposed on a region of the first side surface 222 in which the first recess 2221 is not disposed.

The third region 231c may be disposed between the first region 231a and the second region 231b to connect the two regions 231a and 231b. The third region 231c may be disposed in a region corresponding to the first recess 2221. The third region 231c may have a V-shape corresponding to the first recess 2221.

The second elastic member 232 may be disposed on the first guide portion 220. The second elastic member 232 may be coupled to the first guide portion 220.

The second elastic member 232 may include a fourth region 232a, a fifth region 232b, and a sixth region 232c.

The fourth region 232a may be disposed on the first upper surface 221 of the first guide portion 220. In detail, the fourth region 232a may be disposed on the second sub upper surface 221b of the first guide portion 220. The fourth region may include a first fixing groove (not shown). The first fixing groove may be disposed in a region corresponding to the first fastening protrusion, and may have a shape corresponding to the first fastening protrusion.

The fifth region 232b may be connected to the fourth region 232a. For example, the fifth region 232b may be bent at one end of the fourth region 232a and disposed on the first side surface 222 of the first guide portion 220. The fifth region 232b may be disposed on the first elastic member 231. The fifth region 232b may be parallel to the first region 231a and the second region 231b. The fifth region 232b may be disposed to cover the first elastic member 231.

The sixth region 232c may be connected to the fifth region 232b. For example, the sixth region 232c may be bent at one end of the fifth region and disposed on the first lower surface 223 of the first guide portion 220. A portion of the sixth region 232c may be inserted into the second groove 2232 disposed on the first lower surface 223.

That is, the second elastic member 232 may be physically coupled to the first guide part 220 as the first fixing groove formed in the fourth region 232a engages with the first fastening protrusion, the sixth region 232c is inserted into the second groove 2232. Accordingly, the first elastic portion 230 may maintain a state firmly coupled to the first guide portion 220.

In addition, the first lens barrel 200 may further include a first guide groove (210h1). The first guide groove 210h1 may be disposed in a region extending outwardly from the first barrel portion 210. The first guide groove 210*h*1 may be disposed in a region corresponding to a second pin 450 to be described later. The first guide groove 210*h*1 may provide a space into which the second pin 450 is inserted. The first lens barrel 200 may move in the optical axis direction by the first pin 250 and the second pin 450. In this case, the first guide groove 210*h*1 may have an open shape at one side. For example, the first guide groove 210*h*1 may have an open shape at one side facing the first inner surface of the housing 100. Accordingly, friction and vibration generated when the first lens barrel 200 is moved by the first driving unit 300 can be minimized.

The camera actuator 1000 may include a first driving unit 300. The first driving unit 300 may be disposed in the housing 100. The first driving unit 300 may be coupled to the first lens barrel 200. The first driving unit 300 may move the first lens barrel 200 in the optical axis direction (z-axis direction).

The first driving unit 300 may include a first piezoelectric device 310, a first extension bar 320, a first buffer member 321, and a second buffer member 322.

The first piezoelectric device 310 may include a piezoelectric device. For example, the first piezoelectric device 310 may include a material that causes mechanical deformation by an applied voltage. The first piezoelectric device 310 may contract or expand by an applied voltage and may cause mechanical deformation in a set direction. For example, the first piezoelectric device 310 may generate a vibration while causing mechanical deformation in the optical axis direction (z-axis direction) by an applied voltage.

The first piezoelectric device 310 may include a first disk portion 311 and a first protrusion 512. The first disk portion 311 may have a plate shape and may be disposed on the second hole 112. For example, the first disk portion 311 may be disposed on the first protrusion 112*a* of the second hole 112. In detail, the first disk portion 311 may be disposed on the plurality of first sub-protrusions. The first protrusion 112*a* may support the first disk portion 311.

The first protrusion 512 may be disposed under the first disk portion 311. In detail, the first protrusion 512 may be disposed under the first disk portion 311 in the third direction (z-axis direction) and may be connected to the first disk portion 311. A portion of the first protrusion 512 may be disposed in the second hole 112. The first protrusion 512 may have a shape protruding toward the image sensor 900. A width (x-axis, y-axis direction) of the first protrusion 512 may change toward the optical axis direction. For example, the width of the first protrusion 512 may decrease as it approaches the image sensor 900.

The first extension bar 320 may extend in the optical axis direction. The first extension bar 320 may be disposed parallel to the optical axis and may be connected to the first piezoelectric device 310. For example, an upper end of the first extension bar 320 may be connected to the first protrusion 512. In addition, the lower end of the first extension bar 320 may be inserted into the lower end of the housing 100, for example, a fourth hole (not shown) formed at the lower end of the second housing 120.

In addition, one region of the first extension bar 320 may be connected to the first lens barrel 200. For example, the first extension bar 320 may be connected to the first lens barrel 200 by the first elastic portion 230. In detail, the first extension bar 320 may be disposed between the first elastic member 231 and the second elastic member 232. In more detail, the first extension bar 320 may be disposed between the third region 231*c* of the first elastic member 231 and the fifth region 232*b* of the second elastic member 232. The first extension bar 320 may be fixed by the elastic force of the first elastic member 231 and the second elastic member 232.

The first extension bar 320 may transmit the vibration generated by the first piezoelectric device 310 to the first lens barrel 200. The first lens barrel 200 may move upward or downward (z-axis direction, optical-axis direction) according to the vibration direction of the first extension bar 320. Through this, the second lens unit 205 in the first lens barrel 200 may move to perform a zooming function of zooming up or zooming out.

The first buffer member 321 may be disposed on the first extension bar 320. The first buffer member 321 may be disposed on an upper region of the first extension bar 320. The first buffer member 321 may be disposed in the second hole 112 of the housing 100. For example, the first buffer member 321 may be disposed between the first protrusion 112*a* and the second protrusion 112*b* of the second hole 112. The first buffer member 321 may be fixed to a position set by the first protrusion 112*a* and the second protrusion 112*b*. In addition, the first buffer member 321 may include a through hole into which the first extension bar 320 is inserted.

The second buffer member 322 may be disposed on the first extension bar 320. The second buffer member 322 may be disposed on a lower region of the first extension bar 320. The second buffer member 322 may be spaced apart from the first buffer member 321 in the optical axis direction. The second buffer member 322 may be disposed in a fourth hole (not shown) of the housing 100. The second buffer member 322 may be disposed to be inserted into the fourth hole. The second buffer member 322 may include a through hole into which the first extension bar 320 is inserted.

The first buffer member 321 and the second buffer member 322 may prevent noise caused by the vibration of the first extension bar 320. In addition, the first buffer member 321 and the second buffer member 322 may prevent the first extension bar 320 from being deformed or damaged by an external impact.

The second lens barrel 400 may be disposed in the housing 100. The second lens barrel 400 may be disposed in the second housing 120. The second lens barrel 400 may be disposed under the first lens barrel 200. For example, the second lens barrel 400 may be disposed below the first lens barrel 200 in the optical axis direction, and may be closer to the image sensor 900 than the first lens barrel 200. The second lens barrel 400 may be coupled to the second driving unit 500. The second lens barrel 400 may be moved in the housing 100 by the second driving unit 500. In detail, the second lens barrel 400 may be moved in the optical axis direction by the second driving unit 500.

The second lens barrel 400 may include a second barrel portion 410, a third lens unit 405, a second guide portion 420, and a second elastic portion 430.

The second barrel portion 410 is disposed in a region overlapping the optical axis and may have an open shape on one side and the other side. For example, the second barrel portion 410 may have a cylindrical shape in which one surface and the other surface are open.

The second barrel portion 410 may include the second through hole 411. The second through hole 411 may be a through hole passing through one surface and the other surface of the second barrel portion 410. Here, one surface of the second barrel portion 410 may be a surface facing the first lens barrel 200, and the other surface may be a surface opposite to the one surface and facing the image sensor 900.

The third lens unit 405 may be disposed on the second barrel portion 410. In detail, the third lens unit 405 may be disposed in the second through hole 411. For example, a screw line may be formed on an inner circumferential surface of the second through hole 411, and the third lens unit 405 may be coupled to the second barrel portion 410 by the screw line.

The third lens unit 405 may include at least one lens. The third lens unit 405 may perform an auto focus function. The third lens unit 405 may move in the optical axis direction. In detail, the third lens unit 405 may move in the optical axis direction with respect to the first lens unit 105. The third lens unit 405 may move separately from the second lens unit 205. Also, the distance at which the third lens unit 405 can move in the optical axis direction may be the same as or different from that of the second lens unit 205.

The second guide portion 420 may extend outwardly from the second barrel portion 410. For example, the second guide portion 420 may extend from the second barrel portion 410 in a direction perpendicular to the optical axis, for example, in a first direction (x-axis direction). In this case, the second guide portion 420 may extend in a direction opposite to the first guide portion 220. For example, the first guide portion 220 may extend in the +x-axis direction from the first barrel portion 210, and the second guide portion 420 may extend in the −x-axis direction from the second barrel portion 410.

The second guide portion 420 may include a second lower surface 421, a second side surface 422, and a second upper surface 423.

The second upper surface 423 may face the inner upper surface 122 of the housing 100. The second upper surface 423 may face the inner upper surface 122 of the housing 100 in the second direction (y-axis direction). A third groove 4231 may be disposed on the second upper surface 423. The third groove 4231 may have a concave shape in a direction from the second upper surface 423 to the second lower surface 421. A second magnetic scaler 620 to be described later may be disposed in the third groove 4231.

In addition, a fourth groove 4232 may be disposed on the second upper surface 423. The fourth groove 4232 may be spaced apart from the third groove 4231. The fourth groove 4232 may be disposed in an edge region of the second upper surface 423. The fourth groove 4232 may provide a region in which a portion of the second elastic portion 430, which will be described later, is disposed. In detail, the fourth groove 4232 may provide a region in which the second elastic portion 430 is mounted and fixed.

The second lower surface 421 may face the inner lower surface 121 of the housing 100. The second lower surface 421 may face the inner lower surface 121 of the housing 100 in the second direction (y-axis direction). The second lower surface 421 may include a plurality of sub lower surfaces. In detail, the second lower surface 421 may include a first sub-lower surface 421a and a second sub-lower surface 421b disposed above the first sub-lower surface 421a in the second direction (y-axis direction). That is, the second sub lower surface 421b may be disposed adjacent to the second upper surface 423 than the first sub lower surface 421a. At least one second fastening protrusion (not shown) may be disposed on the second sub lower surface 421b. The second fastening protrusion may have a shape protruding downward from the second sub-lower surface 421b. The second fastening protrusion may be inserted into a second fixing groove (not shown) formed in a second elastic portion 430 to be described later.

Also, the second lower surface 421 may include a second stepped surface 425 disposed between the first sub lower surface 421a and the second sub lower surface 421b. The second stepped surface 425 may be connected to ends of the first sub-lower surface 421a and the second sub-lower surface 421b. The second stepped surface 425 may be defined as the second stepped portion 425. That is, the second lower surface 421 may include the first sub lower surface 421a, the second sub lower surface 421b, and the second stepped portion 425 and may have a stepped structure.

The second side surface 422 may be disposed between the second upper surface 423 and the second lower surface 421. In detail, the second side surface 422 may be a surface connecting the second upper surface 423 and the second lower surface 421. In more detail, the second side surface 422 may be a surface connecting the second sub lower surface 421b and the second upper surface 423. The second side surface 422 may face the first inner surface 123 of the second housing 120 to be described later.

A second recess 4221 may be disposed on the second side surface 422. The second recess 4221 may have a concave shape from the second side surface 422 toward the second barrel portion 410. Also, the second recess 4221 may have a groove shape extending in the optical axis direction (z-axis direction). The second recess 4221 may have a V-shape when viewed from the front.

The second guide portion 420 may include a second insertion hole 420h1. The second insertion hole 420h1 may be a hole passing through one surface and the other surface of the second guide portion 420. Here, one surface of the second guide portion 420 may be a surface facing the first lens barrel 200, and the other surface may be a surface opposite to the one surface and facing the image sensor 900.

A second pin 450 may be disposed in the second insertion hole 420h1. The second pin 450 may be disposed to pass through the second insertion hole 420h1. The second pin 450 may have a shape extending in the optical axis direction (z-axis direction). The second pin 450 may be spaced apart from the first pin 250 and may be parallel to the first pin 250. The second pin 450 may have a length in the optical axis direction longer than that of the second lens barrel 400. The second pin 450 may be coupled to at least one of the first housing 110 and the second housing 120. The second lens barrel 400 may move the second pin 450 as a movement axis in the optical axis direction. Through this, the third lens unit 405 disposed in the second lens barrel 400 may perform a zoom function and/or an autofocus function.

The second elastic portion 430 may be disposed on the second guide portion 420. For example, the second elastic portion 430 may be disposed on the second upper surface 423, the second lower surface 421, and the second side surface 422 of the second guide portion 420. The second elastic portion 430 may be coupled to the second guide portion 420.

The second elastic portion 430 may include a third elastic member 431 and a fourth elastic member 432.

The third elastic member 431 may be coupled to the second guide portion 420. The third elastic member 431 may be disposed at a set position on the second side surface 422.

The third elastic member 431 may have a shape corresponding to the second side surface 422. For example, the third elastic member 431 may include a seventh region 431a, an eighth region 431b, and a ninth region 431c.

The seventh region 431a and the eighth region 431b may be disposed on the second side surface 422 of the second guide portion 420 and may be spaced apart from each other. The seventh region 431a and the eighth region 431b may be disposed on a region of the second side surface 422 in which the second recess 4221 is not disposed.

The ninth region 431c may be disposed between the seventh region 431a and the eighth region 432b to connect the two regions 431a and 431b. The ninth region 431c may be disposed in a region corresponding to the second recess 4221. The ninth region 431c may have a V-shape corresponding to the second recess 4221.

The fourth elastic member 432 may be disposed on the second guide portion 420. The fourth elastic member 432 may be coupled to the second guide portion 420.

The fourth elastic member 432 may include a tenth region 432a, an eleventh region 432b, and a twelfth region 432c.

The tenth region 432a may be disposed on the second lower surface 421 of the second guide portion 420. In detail, the tenth region 432a may be disposed on the second sub lower surface 421b of the second guide portion 420. The tenth region 432a may include a second fixing groove (not shown). The second fixing groove may be disposed in a region corresponding to the second fastening protrusion, and may have a shape corresponding to the second fastening protrusion.

The eleventh region 432b may be connected to the tenth region 432a. For example, the eleventh region 432b may be bent at one end of the tenth region 432a and disposed on the second side surface 422 of the second guide portion 420. The eleventh region 432b may be disposed on the third elastic member 431. The eleventh region 432b may be parallel to the seventh region 431a and the eighth region 431b. The eleventh region 432b may be disposed to cover the third elastic member 431.

The twelfth region 432c may be connected to the eleventh region 432b. For example, the twelfth region 432c may be bent at one end of the eleventh region and disposed on the second upper surface 423 of the second guide portion 420. A portion of the twelfth region 432c may be inserted into the second groove 2232 disposed on the second upper surface 423.

That is, the fourth elastic member 432 may be physically coupled to the second guide part 420 as the twelfth region 432c is inserted into the fourth groove 4232 while the second fixing groove formed in the seventh region 431a is coupled to the second fastening protrusion.

In addition, the second lens barrel 400 may further include a second guide groove 410h1. The second guide groove 410h1 may be disposed in a region extending outwardly from the second barrel portion 410. The second guide groove 410h1 may be disposed in a region corresponding to the first pin 250. The second guide groove 410h1 may provide a space into which the first pin 250 is inserted. The second lens barrel 400 may move in the optical axis direction by the first pin 250 and the second pin 450. In this case, the second guide groove 410h1 may have an open shape at one side. For example, the second guide groove 410h1 may have an open side facing the second inner surface of the housing 100. Accordingly, friction and vibration generated when the second lens barrel 400 is moved by the second driving unit 500 can be minimized.

The camera actuator 1000 may include a second driving unit 500. The second driving unit 500 may be disposed in the housing 100. The second driving unit 500 may be coupled to the second lens barrel 400. The second driving unit 500 may move the second lens barrel 400 in the optical axis direction (z-axis direction).

The second driving unit 500 may include a second piezoelectric device 510, a second extension bar 520, a third buffer member 521, and a fourth buffer member 522.

The second piezoelectric device 510 may include a piezoelectric device. For example, the second piezoelectric device 510 may include a material that causes mechanical deformation by an applied voltage. The second piezoelectric device 510 may contract or expand by an applied voltage and may cause mechanical deformation in a set direction. For example, the second piezoelectric device 510 may generate vibration while causing mechanical deformation in the optical axis direction (z-axis direction) by an applied voltage.

The second piezoelectric device 510 may include a second disk portion 511 and a second protrusion portion 512. The second disk portion 511 has a plate shape and may be disposed on the third hole 113. For example, the second disk portion 511 may be disposed on the third protrusion 113a of the third hole 113. In detail, the second disk portion 511 may be disposed on the plurality of third sub-protrusions. The third protrusion 113a may support the second disc portion 511.

The second protrusion 512 may be disposed under the second disk portion 511. In detail, the second protrusion 512 may be disposed under the second disk portion 511 in the third direction (z-axis direction) and may be connected to the second disk portion 511. A portion of the first protrusion 512 may be disposed in the third hole 113. The second protrusion 512 may have a shape protruding toward the image sensor 900. The width (x-axis, y-axis direction) of the second protrusion 512 may change toward the optical axis direction. For example, the width of the second protrusion 512 may decrease as it approaches the image sensor 900.

The second extension bar 520 may extend in the optical axis direction. The second extension bar 520 may be disposed parallel to the optical axis and may be connected to the second piezoelectric device 510. For example, an upper end of the second extension bar 520 may be connected to the second protrusion 512. In addition, the lower end of the second extension bar 520 may be inserted into the lower end of the housing 100, for example, a fifth hole (not shown) formed at the lower end of the second housing 120.

In addition, one region of the second extension bar 520 may be connected to the second lens barrel 400. For example, the second extension bar 520 may be connected to the second lens barrel 400 by the second elastic portion 430. In detail, the second extension bar 520 may be disposed between the third elastic member 431 and the fourth elastic member 432. In more detail, the second extension bar 520 may be disposed between the ninth region 431c of the third elastic member 431 and the eleventh region 432b of the fourth elastic member 432. The second extension bar 520 may be fixed by the elastic force of the third elastic member 431 and the fourth elastic member 432.

The second extension bar 520 may transmit the vibration generated by the second piezoelectric device 510 to the second lens barrel 400. The second lens barrel 400 may move upward or downward (z-axis direction, optical-axis direction) according to the vibration direction of the second extension bar 520. Through this, the third lens unit 405 in the second lens barrel 400 may move to perform a zooming function of zooming up or out.

The third buffer member 521 may be disposed on the second extension bar 520. The third buffer member 521 may be disposed on an upper region of the second extension bar 520. The third buffer member 521 may be disposed in the third hole 113 of the housing 100. For example, the third buffer member 521 may be disposed between the third protrusion 113a and the fourth protrusion 113b of the third hole 113. The third buffer member 521 may be fixed to a position set by the third protrusion 113a and the fourth protrusion 113*b*. In addition, the third buffer member 521 may include a through hole into which the second extension bar 520 is inserted.

The fourth buffer member 522 may be disposed on the second extension bar 520. The fourth buffer member 522 may be disposed on a lower region of the second extension bar 520. The fourth buffer member 522 may be spaced apart from the third buffer member 521 in the optical axis direction. The fourth buffer member 522 may be disposed in a fifth hole (not shown) of the housing 100. The fourth buffer member 522 may be disposed to be inserted into the fifth hole. The second buffer member 322 may include a through hole into which the second extension bar 520 is inserted.

The third buffer member 521 and the fourth buffer member 522 may prevent noise caused by the vibration of the second extension bar 520. In addition, the third buffer member 521 and the fourth buffer member 522 may prevent the second extension bar 520 from being deformed or damaged by an external impact.

The camera actuator 1000 may include a first magnetic scaler 610, a first sensing unit (not shown), a second magnetic scaler 620, and a second sensing unit (not shown).

The first magnetic scaler 610 may be disposed on the first lens barrel 200. For example, the first magnetic scaler 610 may be disposed on the first lower surface 223. In detail, the first magnetic scaler 610 may be disposed in the first groove 2231 of the first lens barrel 200. The first magnetic scaler 610 may move along the optical axis direction together with the first lens barrel 200.

The first magnetic scaler 610 may include a plurality of magnets. For example, the first magnetic scaler 610 may have an N pole and an S pole alternately disposed in the optical axis direction.

The first sensing unit may be disposed adjacent to the first magnetic scaler 610. For example, the first sensing unit may be disposed to face the first magnetic scaler 610 in a first direction (x-axis direction) or a second direction (y-axis direction). The first sensing unit may detect a position of the first magnetic scaler 610. Through this, the first sensing unit may detect the position and movement of the first lens barrel 200 moving together with the first magnetic scaler 610.

The second magnetic scaler 620 may be disposed on the second lens barrel 400. For example, the second magnetic scaler 620 may be disposed on the second upper surface 423. In detail, the second magnetic scaler 620 may be disposed in the third groove 4231 of the second lens barrel 400. The second magnetic scaler 620 may move along the optical axis direction together with the second lens barrel 400.

The second magnetic scaler 620 may include a plurality of magnets. For example, the second magnetic scaler 620 may have an N pole and an S pole alternately disposed in the optical axis direction.

Also, the second sensing unit may be disposed adjacent to the second magnetic scaler 620. For example, the second sensing unit may be disposed to face the second magnetic scaler 620 in a first direction (x-axis direction) or a second direction (y-axis direction). The second sensing unit may detect a position of the second magnetic scaler 620. Through this, the second sensing unit may detect the position and movement of the second lens barrel 400 moving together with the second magnetic scaler 620.

Also, although not shown in the drawings, the camera actuator 1000 according to the embodiment may further include a gyro sensor (not shown). The gyro sensor may be disposed in the housing 100. The gyro sensor may detect a movement of a user using the camera actuator.

The camera actuator 1000 according to the embodiment may include a substrate 800. The substrate 800 may be disposed on the housing 100. The substrate 800 may be disposed to surround a partial region of the housing 100. For example, the substrate 800 may be disposed to surround a portion of the outer side of the second housing 120. The substrate 800 may provide power or current to components disposed in the housing 100. That is, the substrate 800 may be a circuit board, and may include a circuit board having a wiring pattern that can be electrically connected, such as a rigid printed circuit board (Rigid PCB), a flexible printed circuit board (Flexible PCB), and a rigid flexible printed circuit board (Rigid Flexible PCB).

The substrate 800 may include a first end 810. The first end 810 may be disposed on the first piezoelectric device 310 of the first driving unit 300. For example, the first end 810 may be disposed on the first disk portion 311 of the first piezoelectric device 310. In detail, the first end 810 may be disposed on one surface of the first disk portion 311. Also, the first end 810 may be disposed on the second piezoelectric device 510 of the second driving unit 500. For example, the second end 820 may be disposed on the second disk portion 511 of the second piezoelectric device 510. In detail, the first end 810 may be disposed on one surface of the second disc portion 511.

The substrate 800 may include a second end 820. The first end 810 may be spaced apart from the first end 810. Also, the second end 820 may be disposed in a region that does not overlap the first end 810 in the optical axis direction.

The second end 820 may be disposed on the first piezoelectric device 310 of the first driving unit 300. For example, the second end 820 may be disposed on the first disk portion 311 of the first piezoelectric device 310. In detail, the first end 810 may be disposed on the other surface opposite to one surface of the first disk portion 311. Also, the second end 820 may be disposed on the second piezoelectric device 510 of the second driving unit 500. For example, the second end 820 may be disposed on the second disk portion 511 of the second piezoelectric device 510. In detail, the second end 820 may be disposed on the other surface opposite to one surface of the second disk portion 511.

That is, the substrate 800 may supply power to the first piezoelectric device 310 and the second piezoelectric device 510. Accordingly, the first driving unit 300 and the second driving unit 500 may drive the first lens barrel 200 and the second lens barrel 400 by the applied power, respectively.

The camera actuator 1000 according to the embodiment may include an image sensor 900. The image sensor 900 may collect light passing in the order of the first lens unit 105, the second lens unit 205, and the third lens unit 405 and convert it into an image. The image sensor 900 may be disposed to coincide with the optical axis of the lenses of the lens units 105, 205, and 405. The optical axis of the image sensor 900 and the optical axis of the lens may be aligned.

FIG. 9 is an exploded perspective view of the housing according to the embodiment, and FIG. 10 is a front view of the second housing according to the embodiment. The housing 100 according to the embodiment will be described in more detail with reference to FIGS. 9 and 10.

The housing 100 may have upper and lower partial regions open, and may include an accommodating space therein. The housing 100 may include a first housing 110 and a second housing 120. The first housing 110 and the second housing 120 may be coupled to each other to form an accommodating space therein, and may be provided in a separable structure.

The first housing 110 may accommodate the first lens unit 105. For example, the first lens unit 105 may be disposed in the first hole 111 of the first housing 110. In addition, the first lens barrel 200 and the second lens barrel 400 may be disposed inside the second housing 120.

The second housing 120 may include an inner lower surface 121, an inner upper surface 122, a first inner surface 123, and a second inner surface 124.

The inner lower surface 121 of the second housing 120 may be a surface facing the first lower surface 223 of the first lens barrel 200 and the second lower surface 421 of the second lens barrel 400. The inner lower surface 121 may be a surface facing the second stepped portion 425.

The inner upper surface 122 may face the inner lower surface 121 in the second direction (y-axis direction). The inner upper surface 122 of the second housing 120 may be a surface facing the first upper surface 221 of the first lens barrel 200 and the second upper surface 423 of the second lens barrel 400. The inner upper surface 122 may be a surface facing the first stepped portion 225.

The first inner surface 123 of the second housing 120 may be disposed between the inner lower surface 121 and the inner upper surface 122. The first inner surface 123 may connect one end of the inner lower surface 121 and one end of the inner upper surface 122. The first inner surface 123 of the second housing 120 may face a side portion of the second lens barrel 400. For example, the first inner surface 123 may be a surface facing the second side surface 422 of the second lens barrel 400. In detail, the first inner surface 123 may face the eleventh region 432b of the fourth elastic member 432.

The second inner surface 124 of the second housing 120 may be disposed between the inner lower surface 121 and the inner upper surface 122. The second inner surface 124 may connect the other end of the inner lower surface 121 and the other end of the inner upper surface 122. The second inner surface 124 may face the first inner surface 123 in a first direction (x-axis direction). The second inner surface 124 of the second housing 120 may face a side portion of the first lens barrel 200. For example, the second inner surface 124 may be a surface facing the first side surface 222 of the first lens barrel 200. In detail, the second inner surface 124 may face the fifth region 232b of the second elastic member 232.

The second housing 120 may include a guide jaw 125. The guide jaw 125 may be disposed on the inner lower surface 121. The guide jaw 125 has a shape that protrudes from the inner lower surface 121 toward the inner upper surface 122 and may extend in the optical axis direction.

An optical axis direction length of the guide jaw 125 may be the same as an optical axis direction length of the inner lower surface 121. In this case, the guide jaw 125 may extend in the optical axis direction from the boundary of the inner lower surface 121 connected to the first housing 110 to the end of the inner lower surface 121.

Also, the optical axis direction length of the guide jaw 125 may be shorter than the optical axis direction length of the inner lower surface 121. In this case, the guide jaw 125 may extend from the boundary of the inner lower surface 121 in the optical axis direction, and may be spaced apart from the end of the inner lower surface 121.

The guide jaw 125 may be disposed adjacent to the second driving unit 500 than the first driving unit 300. In addition, the guide jaw 125 may be disposed closer to the second pin 450 than the first pin 250.

FIG. 11 is a front view of a second driving unit disposed in a second housing according to an exemplary embodiment, FIG. 12 is a front view in which first and second driving units are disposed in a second housing according to an embodiment, and FIG. 13 is a view showing first and second driving units according to an embodiment.

Referring to FIGS. 11 to 13, the first lens barrel 200 and the second lens barrel 400 may be disposed in the housing 100.

For example, when manufacturing the camera actuator 1000 according to the embodiment, the second lens barrel 400 may be inserted into the second housing 120 before the first lens barrel 200 as shown in FIG. 11. In this case, the second lens barrel 400 may be disposed at a position set by the first pin 250 and the second pin 450.

In detail, the second lens barrel 400 may be disposed so that the second lower surface 421 faces the inner lower surface 121, and the second upper surface 423 may be disposed to face the inner upper surface 122. In addition, the second lens barrel 400 may be disposed so that the second side surface 422 faces the first inner surface 123, and the second guide groove 410h1 may be disposed to face the second inner surface 124. That is, the second stepped portion 425 of the second lens barrel 400 may face the inner lower surface 121.

The guide jaw 125 may guide the second lens barrel 400. To this end, the guide jaw 125 may be positioned in a region corresponding to the second lens barrel 400. For example, the guide jaw 125 may be disposed in a region corresponding to the second lower surface 421 and the second stepped portion 425 of the second lens barrel 400. In detail, the guide jaw 125 may be disposed in a region overlapping the second sub lower surface 421b of the second lens barrel 400 in the second direction (y-axis direction), and may be disposed in a region that does not overlap the first sub lower surface 421a.

In this case, the upper surface of the guide jaw 125 may be positioned above the first sub lower surface 421a in the second direction (y-axis direction). Also, the upper surface of the guide jaw 125 may be disposed to face the second sub lower surface 421b. In this case, the upper surface of the guide jaw 125 may be disposed in contact with the second sub lower surface 421b, or may be spaced apart from each other by a predetermined interval.

In addition, one side of the guide jaw 125 may be disposed to face the second stepped portion 425 in the first direction (x-axis direction). At this time, one side of the guide jaw 125 may be disposed in contact with the second stepped portion 425 or may be spaced apart from each other by a predetermined interval.

In detail, the second lens barrel 400 may include a first distance d1. Here, the first distance d1 may be defined as a distance from one side of the second lens barrel 400 to the second stepped portion 425. In detail, the first distance d1 may be defined as a distance in the first direction (x-axis direction) from the second side surface 422 to the second stepped portion 425. The first distance d1 may be greater than or equal to a distance in the first direction from the second side surface 422 to the guide jaw 125. For example, when the first distance d1 is the same as the distance from the second side surface 422 to the guide jaw 125, the guide jaw 125 may come into contact with the second stepped portion 425.

In addition, when the first distance d1 is longer than the distance from the second side surface 422 to the guide jaw 125, the guide jaw 125 may be spaced apart from the first stepped portion 225 by a predetermined distance. In this case, the driving friction of the second lens barrel 400 may be reduced.

Alternatively, when the first distance d1 is shorter than the distance from the second side surface 422 to the guide jaw 125, the second lens barrel 400 may not be inserted into the second housing 120. In detail, in the above-described case, the guide jaw 125 may be positioned in a region corresponding to the first sub lower surface 421a. Accordingly, the second lens barrel 400 may not be inserted into the second housing 120 by the guide jaw 125.

That is, the second lens barrel 400 preferably satisfies the first distance d1 in the above-described range. Accordingly, the second lens barrel 400 can be effectively inserted in the manufacturing process, and the driving friction between the guide jaw 125 and the second lens barrel 400 may be minimized when the second lens barrel 400 is driven.

In addition, the first lens barrel 200 may be inserted and disposed after the second lens barrel 400 is first disposed in the housing 100 as shown in FIG. 12. In this case, the first lens barrel 200 may be disposed at a position set by the first pin 250 and the second pin 450.

In detail, the first lens barrel 200 may be disposed so that the first lower surface 223 faces the inner lower surface 121, and the first upper surface 221 may be disposed to face the inner upper surface 122. In addition, in the first lens barrel 200, the first side surface 222 may be disposed to face the second inner surface 124, and the first guide groove 210h1 may be disposed to face the first inner surface 123. That is, the first stepped portion 225 may face the inner upper surface 122.

The guide jaw 125 may be spaced apart from the first lens barrel 200. For example, the first lens barrel 200 may be disposed in a region that does not correspond to the guide jaw 125. In detail, the first lens barrel 200 may not overlap the guide jaw 125 in the second direction (y-axis direction). Accordingly, the first lens barrel 200 may be inserted without being caught in the guide jaw 125 during the process of disposing it in the housing 100.

The first lens barrel 200 may include a second distance d2. Here, the second distance d2 may be defined as a distance from one side of the first lens barrel 200 to the first stepped portion 225. In detail, the first distance d1 may be defined as a distance in the first direction (x-axis direction) from the first side surface 222 to the first stepped portion 225.

In this case, the first distance d1 and the second distance d2 may be different from each other. In detail, the first distance d1 may be longer than the second distance d2. Also, the second distance d2 may be shorter than a distance in the first direction from the second side surface 422 to the guide jaw 125. Accordingly, it is possible to prevent the first lens barrel 200 from being first inserted and disposed at the position of the second lens barrel 400.

In detail, the first lens barrel 200 and the second lens barrel 400 may have the same or similar appearance to each other. For this reason, in the process of manufacturing the camera actuator, the first lens barrel 200 is mistaken for the second lens barrel 400, and is first inserted into the second lens barrel 400 position and assembled. Accordingly, there is a problem in that an optical characteristic of the camera actuator 1000 is changed and a defect occurs.

However, the first lens barrel 200 and the second lens barrel 400 according to the embodiment may include a first stepped portion 225 and a second stepped portion 425. In addition, the first lens barrel 200 and the second lens barrel 400 may be included a first distance d1 and a second distance d2 different from each other by the first stepped portion 225 and the second stepped portion 425. The distance d2.

In addition, the housing 100 according to the embodiment may include a guide jaw 125 disposed on the inner lower surface 121. In this case, the guide jaw 125 may be disposed at a position corresponding to the second stepped portion 425. In addition, the guide jaw 125 may have a distance characteristic corresponding to the first distance d1.

Accordingly, the second lens barrel 400 can be effectively inserted into the housing 100 in the process of assembling the first lens barrel 200 and the second lens barrel 400. In addition, it is possible to prevent the first lens barrel 200 from being mistakenly mistaken for the second lens barrel 400 to be preferentially disposed at the second lens barrel 400 position during the assembling process.

In detail, the second distance d2 may be shorter than the first distance d1. Accordingly, when the first lens barrel 200 is first inserted into the position of the second lens barrel 400, the first sub upper surface 221a of the first lens barrel 200 may be in contact with the guide jaw 125. That is, the first lens barrel 200 may be caught on the guide jaw 125 so that insertion into the second housing 120 may not be possible.

That is, in the embodiment, the second lens barrel 400 can be easily disposed in the process of manufacturing the camera actuator 1000, and it is possible to prevent the first lens barrel 200 from being inserted in reverse and misplaced. Accordingly, the embodiment may reduce defects due to misplacement and may have improved process efficiency.

FIG. 14 is a perspective view of a camera module according to an embodiment, and FIG. 15 is a perspective view in which some components are omitted from the camera module according to the embodiment.

Referring to FIGS. 14 and 15, the camera module 10 according to the embodiment may include one or a plurality of camera actuators. For example, the camera module 10 may include a first camera actuator 1000 and a second camera actuator 2000, and a cover case 15 for protecting the first camera actuator 1000 and the second camera actuator 2000 may be included.

The first camera actuator 1000 may support a plurality of lenses and may perform a zoom function or an autofocus function by moving the lenses in the optical axis direction in response to a control signal from the controller. That is, the first camera actuator 1000 may be the camera actuator of FIGS. 1 to 14 described above.

The second camera actuator 2000 may be an optical image stabilizer (OIS) actuator. In this case, the light incident on the camera module 10 from the outside may be preferentially incident on the second camera actuator 2000. In addition, the light incident on the second camera actuator 2000 may be incident on the first camera actuator 1000 by changing the path of the light, and the light passing through the first camera actuator 1000 may be incident on the image sensor 900.

FIG. 16 is an exploded perspective view of a second camera actuator according to an embodiment. Also, FIG. 17 is a view of a third driving unit of the second camera actuator according to the embodiment, and FIG. 18 is a view of a third housing of the second camera actuator according to the embodiment. FIGS. 19 and 20 are views of the prism unit of the second camera actuator according to the embodiment.

The second camera actuator according to the embodiment will be described in more detail with reference to FIGS. 16 to 20.

Referring to FIG. 16, the second camera actuator 2000 may include a cover member 2100, a third housing 2200, a third driving unit 2300, and a prism unit 2400.

The cover member 2100 may include an accommodating space therein, and at least one side surface may be open. For example, the cover member 2100 may have a structure in which a plurality of side surfaces connected to each other are opened. In detail, the cover member 2100 may have a structure in which a front surface through which light is incident from the outside, a lower surface corresponding to the first camera actuator 1000, and a rear surface opposite the front surface, and a light movement path of the prism unit 2400, which will be described later, may be provided.

The cover member 2100 may include a rigid material. For example, the cover member 2100 may include a material such as resin, metal, or ceramic, and may support the third housing 2200 disposed in the accommodation space. For example, the cover member 2100 is disposed to surround the third housing 2200, the third driving unit 2300, the prism unit 2400, and the like, and may support the components.

Referring to FIG. 17, the third driving unit 2300 may include a driving unit circuit board 2310, a coil unit 2330, and a magnet 2350.

The driving unit circuit board 2310 may be connected to a power source (not shown) to apply power to the coil unit 2330. The driving unit circuit board 2310 may include a circuit board having a wiring pattern that can be electrically connected, such as a rigid printed circuit board (Rigid PCB), a flexible printed circuit board (Flexible PCB), and a rigid flexible printed circuit board (Rigid Flexible PCB).

The coil unit 2330 may be electrically connected to the driving unit circuit board 2310. The coil unit 2330 may include one or a plurality of coil units. For example, the coil unit 2330 may include a first coil unit 2331, a second coil unit 2332, and a third coil unit 2333.

The first to third coil units 2331, 2332, and 2333 may be spaced apart from each other. For example, the driving unit circuit board 2310 may have a 'C' shape, and the first coil unit 2331 and the second coil unit 2332 may be respectively disposed on first and second surfaces of the driving unit circuit board 2310 facing each other. Also, the third coil unit 2333 may be disposed on a third surface connecting the first and second surfaces of the driving unit circuit board 2310.

The magnet 2350 may include one or a plurality of magnets. For example, the magnet 2350 may include a first magnet 2351, a second magnet 2352, and a third magnet 2353 disposed in a region corresponding to the coil unit 2330. In detail, the first magnet 2351 may be disposed on a region corresponding to the first coil unit 2331 on the first surface of the driving unit circuit board 2310. Also, the second magnet 2352 may be disposed on a region corresponding to the second coil unit 2332 on the second surface of the driving unit circuit board 2310. Also, the third magnet 2353 may be disposed on a region corresponding to the third coil unit 2333 on the third surface of the driving unit circuit board 2310.

The third driving unit 2300 may further include a Hall sensor. For example, the Hall sensor includes a first Hall sensor (not shown) disposed adjacent to one coil unit selected from among the first coil unit 2331 and the second coil unit 2332, and a second Hall sensor (not shown) disposed adjacent to the third coil unit 2333.

The third driving unit 2300 may tilt the prism unit 2400. The third driving unit 2300 may control the tilting of the prism unit 2400 along a first axis or a second axis.

Referring to FIG. 18, the third housing 2200 may include an accommodation space for accommodating the prism unit 2400. The third housing 2200 may include a plurality of inner surfaces. For example, the third housing 2200 may be included a first surface 2200S1 corresponding to a first region of the driving unit circuit board 2310 and a second surface 2200S2 corresponding to a second region of the driving unit circuit board 2310, and a third surface 2200S3 corresponding to the third region of the driving unit circuit board 2310.

In detail, the third housing 2200 includes a first surface 2200S1 corresponding to the first coil unit 2331, a second surface 2200S2 corresponding to the second coil unit 2332, and the third surface 2200S3 corresponding to the third coil unit 2333. In addition, the third housing 2200 may include a fourth surface 2200S4 connected to the first surface 2200S1 and the second surface 2200S2 and connected to the third surface 2200S3.

The third housing 2200 may include a plurality of housing holes 2210. The housing hole 2210 may be a through hole penetrating the outer and inner surfaces of the third housing 2200. The plurality of housing holes 2210 may include first to third housing holes 2211, 2212, and 2213. The first housing hole 2211 may be a through hole passing through the first surface 2200S1 and an outer surface corresponding to the first surface 2200S1. The second housing hole 2212 may be a through hole passing through the second surface 2200S2 and an outer surface corresponding to the second surface 2200S2. The third housing hole 2213 may be a through hole passing through the third surface 2200S3 and an outer surface corresponding to the third surface 2200S3.

The first housing hole 2211 may be disposed in a region corresponding to the first coil unit 2331. Also, the first housing hole 2211 may have a size and shape corresponding to that of the first coil unit 2331. Accordingly, the first coil unit 2331 may be partially or entirely inserted into the first housing hole 2211.

The second housing hole 2212 may be disposed in a region corresponding to the second coil unit 2332. Also, the second housing hole 2212 may have a size and shape corresponding to that of the second coil unit 2332. Accordingly, the second coil unit 2332 may be partially or entirely inserted into the second housing hole 2212.

The third housing hole 2213 may be disposed in a region corresponding to the third coil unit 2333. Also, the third housing hole 2213 may have a size and shape corresponding to that of the third coil unit 2333. Accordingly, the third coil unit 2333 may be partially or entirely inserted into the third housing hole 2213.

Referring to FIGS. 19 and 20, the prism unit 2400 may be disposed in the third housing 2200. In detail, the prism unit 2400 may be disposed in the accommodation space of the third housing 2200.

The prism unit 2400 may include a prism 2410 and a prism mover 2430 disposed on the prism 2410.

The prism 2410 may be a right-angle prism. The prism 2410 may reflect the direction of light incident from the outside. That is, the prism 2410 may change the path of the light incident to the second camera actuator 2000 from the outside toward the first camera actuator 1000.

The prism mover 2430 may be disposed on the prism 2410. The prism mover 2430 may be disposed to surround the prism 2410. At least one side of the prism mover 2430 may be open and may include an accommodating space therein. In detail, the prism mover 2430 may have a structure in which a plurality of outer surfaces connected to each other are opened. For example, the prism mover 2430 may have a structure in which an outer surface corresponding to the prism 2410 is open, and may include an accommodation space defined as a first space 2435 therein.

The prism mover 2430 may include an inner surface 2435S. The inner surface 2435S may be an inner surface constituting the first space 2435. The first space 2435 may have a shape corresponding to the prism 2410. The inner surface 2435S of the first space 2435 may directly contact the prism 2410.

The prism mover 2430 may include a step 2436. The step 2436 may be disposed in the first space 2435. The step 2436 may serve as a guide and/or a seating part for the prism 2410. In detail, a protrusion corresponding to the step 2436 may be formed on the outside of the prism 2410. The prism 2410 may be disposed in the first space 2435 such that the protrusion is guided by the step 2436 of the prism mover 2430. Accordingly, the prism mover 2430 may effectively support the prism 2410. In addition, the prism 2410 may be seated at a set position, and may have improved alignment characteristics within the prism mover 2430.

The prism unit 2400 may include a plurality of outer surfaces. For example, the prism mover 2430 may include a plurality of outer surfaces. The prism mover 2430 may include a first outer surface 2430S1 corresponding to the first surface 2200S1 of the third housing 2200, a second outer surface 2430S2 corresponding to the second surface 2200S2, a third outer surface 2430S3 corresponding to the third surface 2200S3 and a fourth outer surface 2430S4 corresponding to the fourth surface 2200S4.

Also, the prism mover 2430 may include a plurality of recesses. The recess may be a groove having a concave shape on the outer surface of the prism mover 2430 in the direction of the first space 2435. The plurality of recesses may include a third recess 2433R1, a fourth recess 2433R2, and a fifth recess 2433R3. For example, the third recess 2433R1 may be disposed on the first outer surface 2430S1. The third recess 2433R1 may be disposed in a region corresponding to the first housing hole 2211. Also, the fourth recess 2433R2 may be disposed on the second outer surface 2430S2. The fourth recess 2433R2 may be disposed in a region corresponding to the second housing hole 2212. Also, the fifth recess 2433R3 may be disposed on the third outer surface 2430S3. The fifth recess 2433R3 may be disposed in a region corresponding to the third housing hole 2213. That is, the first housing hole 2211 may correspond to the first coil unit 2331, and the second housing hole 2212 may correspond to the second coil unit 2332. Also, the third housing hole 2213 may correspond to the third coil unit 2333.

The magnet 2350 may be disposed in the recess. For example, the first magnet 2351 is in the third recess 2433R1, the second magnet 2352 is in the fourth recess 2433R2, and the third magnet 2353 is in the third recess 2433R1 so that they can be spaced apart from each other.

The prism unit 2400 may control tilting in a first axis (x-axis) or a second axis (y-axis) by a driving unit of the third driving unit 2300. Here, the first axis tilting may mean tilting in the vertical direction (y-axis direction; second direction) with the x-axis direction shown in the drawing as the rotation axis, and the second axis tilting may mean tilting in the left and right direction (x-axis direction; first direction) with the y-axis direction shown in the drawing as the rotation axis.

The prism unit 2400 may be tilt-controlled based on attractive and repulsive forces generated from the third coil unit 2333 and the third magnet 2353 when power is applied.

In detail, the third driving unit 2300 includes a virtual first line formed by the first coil unit 2331, the second coil unit 2332, the first magnet 2351, and the second magnet 2352. The prism unit 2400 may be provided rotatably about a line (not shown) as an axis. Here, the first line may be a line extending in the first direction (x-axis direction).

The third coil unit 2333 and the third magnet 2353 may rotate the prism unit 2400 in an up-down direction (y-axis direction) with the first line as a rotation axis.

For example, a repulsive force is generated between the third coil unit 2333 and the third-first magnet of the third magnet 2353, and an attractive force may be generated between the third coil unit 2333 and the third magnet third-second of the third magnet 2353. Here, the third-first magnet and the third-second magnet may face each other in a third direction (z-axis direction). In this case, the prism unit 2400 may be tilted in the upper direction (based on the y-axis direction) by the generated electromagnetic force.

In addition, an attractive force is generated between the third coil unit 2333 and the third-first magnet of the third magnet 2353, and a repulsive force may be generated between the third coil unit 2333 and the third-second magnet of the third magnet 2353. In this case, the prism unit 2400 may be tilted in the lower direction (based on the y-axis direction) by the generated electromagnetic force.

The prism unit 2400 may be tilt-controlled based on attractive and repulsive forces generated from the first coil unit 2331, the second coil unit 2332, the first magnet 2351, and the second magnet 2352 when power is applied.

In detail, the third driving unit 2300 may be provided such that the prism unit 2400 can be rotated about a second virtual line (not shown) formed by the third magnet 2353 and the third coil unit 2333 as an axis. Here, the second line may be a line extending in the second direction (y-axis direction).

The first coil unit 2331, the second coil unit 2332, the first magnet 2351 and the second magnet 2352 may rotate and move the prism unit 2400 in a left-right direction (x-axis direction) with the second line as a rotation axis.

For example, a repulsive force is generated between the first coil unit 2331 and the first-first magnet of the first magnet 351, and an attractive force may be generated between the first coil unit 2331 and the first-second magnet of the first magnet 2351. In addition, an attractive force is generated between the second coil unit 2332 and the second-first magnet of the second magnet 2352, and a repulsive force may be generated between the second coil unit 2332 and the second-second magnet of the second magnet 2352. Here, the first-first magnet and the second-first magnet may face each other in a first direction, and the first-second magnet and the second-second magnet may face each other in a first direction. In this case, the prism unit 2400 may be tilted in the left direction (based on the x-axis direction) by the generated electromagnetic force.

In addition, an attractive force is generated between the first coil unit 2331 and the first-first magnet of the first magnet 2351, and a repulsive force may be generated between the first coil unit 2331 and the first-second magnet of the first magnet 2351. In addition, a repulsive force is generated between the second coil unit 2332 and the second-first magnet of the second magnet 2352, and an attractive force may be generated between the second coil unit 2332 and the second-second magnet of the second magnet 2352. In this case, the prism unit 2400 may be tilted in the right direction (based on the x-axis direction) by the generated electromagnetic force.

That is, the second camera actuator 2000 according to the embodiment may control the movement path of the light incident by the third driving unit 2300 including the VCM (Voice Coil Motor) method. However, the embodiment is not limited thereto, and the third driving unit 2300 may include a piezoelectric device, for example, a piezo-electric device or a shape memory alloy, and the movement path of the incident light may be controlled by using the piezo element and/or the shape memory alloy.

FIG. 21 is a perspective view of a mobile terminal to which a camera module according to an embodiment is applied.

Referring to FIG. 21, the mobile terminal 3 may include a camera module 10, an autofocus device 31, and a flash module 33 provided on the rear side.

The camera module 10 may include an image capturing function and an auto focus function. For example, the camera module 10 may include an auto-focus function using an image.

The camera module 10 processes an image frame of a still image or a moving image obtained by an image sensor in a shooting mode or a video call mode. The processed image frame may be displayed on a predetermined display unit and stored in a memory. A camera (not shown) may also be disposed on the front of the mobile terminal body.

For example, the camera module 10 may include a first camera module 10A and a second camera module 10B. In this case, at least one of the first camera module 10A and the second camera module 10B may include the aforementioned camera module, for example, the camera module 10 according to FIGS. 1 to 20. Accordingly, the camera module 10 may implement an OIS function together with a zoom function and an autofocus function.

The auto focus device 31 may include an auto focus function using a laser. The auto focus device 31 may be mainly used in a condition in which the auto focus function using the image of the camera module 10 is deteriorated, for example, in proximity of 10 m or less or in a dark environment. The autofocus device 31 may include a light emitting unit including a vertical cavity surface emitting laser (VCSEL) semiconductor device and a light receiving unit that converts light energy such as a photodiode into electrical energy.

The flash module 33 may include a light emitting device emitting light therein. The flash module 33 may be operated by a camera operation of a mobile terminal or by a user's control.

Next, FIG. 22 is a perspective view of the vehicle 5 to which the camera module according to the embodiment is applied. For example, FIG. 22 is an external view of a vehicle including a vehicle driving assistance device to which the camera module 10 according to the embodiment is applied.

Referring to FIG. 22, the vehicle 5 according to the embodiment may include wheels 53FL and 53RL that rotate by a power source and a predetermined sensor. The sensor may be the camera sensor 51, but is not limited thereto.

The camera 51 may be a camera sensor to which the camera module 10 according to the embodiment is applied.

The vehicle 5 of the embodiment may acquire image information through a camera sensor 51 that captures a front image or a surrounding image, and it is possible to determine a lane non-identification situation using the image information, and generate a virtual lane when the lane is not identified.

For example, the camera sensor 51 may acquire a front image by photographing the front of the vehicle 5, and a processor (not shown) may obtain image information by analyzing an object included in the front image.

For example, when an object such as a median, curb, or street tree corresponding to a lane, an adjacent vehicle, a driving obstacle, and an indirect road marking is captured in the image captured by the camera sensor 51, the processor may detect such an object and include it in the image information.

In this case, the processor may further supplement the image information by acquiring distance information from the object detected through the camera sensor 51. The image information may be information about an object photographed in an image.

The camera sensor 51 may include an image sensor and an image processing module. The camera sensor 51 may process a still image or a moving image obtained by an image sensor (eg, CMOS or CCD). The image processing module may process a still image or a moving image obtained through the image sensor, extract necessary information, and transmit the extracted information to the processor.

In this case, the camera sensor 51 may include a stereo camera to improve the measurement accuracy of the object and further secure information such as the distance between the vehicle 5 and the object, but is not limited thereto.

Features, structures, effects, etc. described in the above embodiments are included in at least one embodiment, and it is not necessarily limited to only one embodiment. Furthermore, features, structures, effects, etc. illustrated in each embodiment can be combined or modified for other embodiments by those of ordinary skill in the art to which the embodiments belong. Accordingly, the contents related to such combinations and variations should be interpreted as being included in the scope of the embodiments.

In the above, the embodiment has been mainly described, but this is only an example and does not limit the embodiment, and those of ordinary skill in the art to which the embodiment pertains will appreciate that various modifications and applications not illustrated above are possible without departing from the essential characteristics of the present embodiment. For example, each component specifically shown in the embodiment can be implemented by modification. And the differences related to these modifications and applications should be interpreted as being included in the scope of the embodiments set forth in the appended claims.

The invention claimed is:

1. A camera actuator comprising:
   a housing;
   a first lens unit;
   a first lens barrel;
   a second lens barrel;
   a first driving unit coupled to the first lens barrel in the housing and configured to move the first lens barrel in an optical axis direction; and
   a second driving unit coupled to the second lens barrel in the housing and configured to move the second lens barrel in the optical axis direction,
   wherein the first lens unit, the first lens barrel, and the second lens barrel are arranged sequentially in the housing in the optical axis direction
   wherein the first lens barrel includes:
      a first side surface facing the first lens unit;
      a second side surface facing the second lens barrel;
      a third side surface orthogonal to the first side surface and the second side surface;
      a first upper surface orthogonal to the first side surface and the second side surface; and
      a first lower surface on a side opposite the first upper surface,
      wherein the second lens barrel includes:
      a fourth side surface facing the first lens barrel;

a fifth side surface on a side opposite the fourth side surface;

a sixth side surface orthogonal to the fourth side surface and the fifth side surface;

a second upper surface orthogonal to the fourth side surface and the fifth side surface; and a second lower surface on a side opposite the second upper surface, wherein each of the surfaces of the first lens barrel and the second lens barrel face inner surfaces of the housing, wherein the first upper surface of the first lens barrel includes a first stepped portion extending from the first side surface to the second side surface, wherein the second lower surface of the second lens barrel includes a second stepped portion, the second stepped portion configured to divide the second lower surface into a first second lower surface having a first height and a second second lower surface having a second height different from the first height, wherein a first distance from the sixth side surface of the second lens barrel to the second stepped portion is different from a second distance from the third side surface of the first lens barrel to the first stepped portion, wherein the first distance is greater than the second distance, wherein the housing includes a guide disposed on an inner lower surface of the housing facing the second lower surface of the second lens barrel, and wherein the guide is a protrusion that protrudes in a direction towards the second upper surface of the second lens barrel, the guide extending in the optical axis direction and is located in a region corresponding to the second stepped portion to come into contact with the second stepped portion.

2. The camera actuator of claim 1, wherein the housing includes:

a first housing in which the first lens unit is disposed; and a second housing under the first housing and in which the first lens barrel and the second lens barrel are disposed.

3. The camera actuator of claim 2, wherein a length of the guide relative to the optical axis direction is less than or equal to a length of an inner lower surface of the second housing.

4. The camera actuator of claim 1, wherein the first lens barrel includes:

a first barrel portion including a second lens unit;

a first guide portion extending outwardly from the first barrel portion; and a first elastic portion connected to the first driving unit, wherein the second lens barrel includes:

a second barrel portion including a third lens unit;

a second guide portion extending outwardly from the second barrel portion; and a second elastic portion connected to the second driving unit.

5. The camera actuator of claim 4, wherein the first driving unit includes:

a first piezoelectric device disposed in the housing; and a first extension bar extending from the first piezoelectric device in the optical axis direction, wherein the second driving unit includes:

a second piezoelectric device disposed in the housing; and a second extension bar extending from the second piezoelectric device in the optical axis direction, wherein one region of the first extension bar is connected to the first elastic portion, and wherein one region of the second extension bar is connected to the second elastic portion.

6. The camera actuator of claim 5, further comprising:

first and second pins extending in the optical axis direction within the housing and spaced apart from each other, wherein the first pin is disposed to be inserted into a first insertion hole of the first lens barrel, wherein the second pin is disposed to be inserted into a second insertion hole of the second lens barrel, wherein the first lens barrel moves along the first pin, and wherein the second lens barrel moves along the second pin.

7. The camera actuator of claim 6, wherein the first lens barrel further includes a first guide groove in which the second pin is disposed, wherein the second lens barrel further includes a second guide groove in which the first pin is disposed, wherein each of the first and second guide grooves has an open shape at one side.

8. The camera actuator of claim 1, further comprising:

a first magnetic scaler disposed on the first lower surface of the first lens barrel; and a second magnetic scaler disposed on the second upper surface of the second lens barrel.

9. A camera actuator comprising:

a housing, a first lens unit;

a first lens barrel;

a second lens barrel;

a first driving unit coupled to the first lens barrel in the housing and configured to move the first lens barrel in an optical axis direction; and a second driving unit coupled to the second lens barrel in the housing and configured to move the second lens barrel in the optical axis direction, wherein the first lens unit, the first lens barrel and the second lens barrel are arranged sequentially in the housing in the optical axis direction, wherein the housing includes an inner lower surface facing a lower surface of each of the first and second lens barrels, wherein a guide is disposed on the inner lower surface of the housing and protrudes in an inner upper surface direction, wherein the guide is disposed in a region overlapping the second lens barrel without overlapping the first lens barrel, wherein a lower surface of the second lens barrel includes a second stepped portion, the second stepped portion is configured to divide the lower surface into a first second lower surface having a first height and a second lower surface having a second height different from the first height, and wherein the guide contacts the second lower surface without contacting the first second lower surface.

10. The camera actuator of claim 9, wherein an upper surface of the guide is disposed above the first second lower surface.

11. The camera actuator claim 9, wherein an upper surface of the first lens barrel includes:

a first sub upper surface, a second sub upper surface disposed below the first sub upper surface, and a first stepped portion connecting between the first and second sub upper surfaces.

12. The camera actuator of claim 11, wherein a first distance from one side of the second lens barrel to the second stepped portion is different from a second distance from one side of the first lens barrel to the first stepped portion.

13. The camera actuator of claim 12, wherein the first distance is longer than the second distance.

14. A camera module comprising:

a first camera actuator, and a second camera actuator, wherein the first camera actuator is configured to perform an auto focusing or zoom function, and wherein the second camera actuator is configured to perform an OIS (Optical Image Stabilizer) function, wherein the first camera actuator includes:

a housing;

a first lens unit;

a first lens barrel;

a second lens barrel;

a first driving unit coupled to the first lens barrel in the housing and configured to move the first lens barrel in an optical axis direction; and a second driving unit coupled to the second lens barrel in the housing and configured to move the second lens barrel in the optical axis direction, wherein the first lens unit, the first lens barrel, and the second lens barrel are arranged sequentially in the housing in the optical axis direction, wherein the first lens barrel includes:

a first side surface facing the first lens unit;

a second side surface facing the second lens barrel;

a third side surface orthogonal to the first side surface and the second side surface;

a first upper surface orthogonal to the first side surface and the second side surface; and a first lower surface on a side opposite the first upper surface, wherein the second lens barrel includes:

a fourth side surface facing the first lens barrel;

a fifth side surface on a side opposite the fourth side surface;

a sixth side surface orthogonal to the fourth side surface and the fifth side surface;

a second upper surface orthogonal to the fourth side surface and the fifth side surface; and a second lower surface on a side opposite the second upper surface, wherein each of the surfaces of the first lens barrel and the second lens barrel face inner surfaces of the housing, wherein the first upper surface of the first lens barrel includes a first stepped portion extending from the first side surface to the second side surface, wherein the second lower surface of the second lens barrel includes a second stepped portion, the second stepped portion configured to divide the second lower surface into a first second lower surface having a first height and a second second lower surface having a second height different from the first height, wherein a first distance from the sixth side surface of the second lens barrel to the second stepped portion is different from a second distance from the third side surface of the first lens barrel to the first stepped portion, wherein the housing includes a guide disposed on an inner lower surface of the housing, and wherein the guide is a protrusion that protrudes in a direction towards the second upper surface of the second lens barrel, the guide extending in the optical axis direction and is located in a region corresponding to the second stepped portion to come into contact with the second stepped portion.

15. The camera module of claim 14, wherein light incident on the camera module from an outside is incident on the first camera actuator through the second camera actuator.

16. The camera module of claim 14, wherein the first distance is greater than the second distance.

\* \* \* \* \*